United States Patent
Sampath et al.

(10) Patent No.: US 11,324,014 B2
(45) Date of Patent: May 3, 2022

(54) EXPOSURE DETECTION IN MILLIMETER WAVE SYSTEMS

(71) Applicant: QUALCOMM Incorporated, San Diego, CA (US)

(72) Inventors: Ashwin Sampath, Skillman, NJ (US); Joseph Burke, Glenview, IL (US); Raghu Challa, San Diego, CA (US); Udara Fernando, San Diego, CA (US); Andrzej Partyka, Bedminster, NJ (US); Muhammad Nazmul Islam, Edison, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 15/852,743

(22) Filed: Dec. 22, 2017

(65) Prior Publication Data

US 2019/0200365 A1 Jun. 27, 2019

(51) Int. Cl.
*H04W 72/08* (2009.01)
*H04B 1/3827* (2015.01)
(Continued)

(52) U.S. Cl.
CPC ........ *H04W 72/085* (2013.01); *H04B 1/3838* (2013.01); *H04B 17/318* (2015.01);
(Continued)

(58) Field of Classification Search
CPC ................ H04B 1/3838; H04B 17/318; H04B 17/0617; H04B 17/102; H04B 17/13;
(Continued)

(56) References Cited

U.S. PATENT DOCUMENTS 5,815,820 A * 9/1998 Kiem ................... H04B 1/3838
455/575.7
9,338,679 B1 5/2016 Sheppard
(Continued)

FOREIGN PATENT DOCUMENTS

CN 106686643 A 5/2017

OTHER PUBLICATIONS

Hochwald B.M., et al., "Minimizing Exposure to Electromagnetic Radiation in Portable Devices", Information Theory and Applications Workshop, 2012, 7 Pages.
(Continued)

*Primary Examiner* — Dung B Huynh
(74) *Attorney, Agent, or Firm* — Arent Fox, LLP

(57) ABSTRACT

In order to maintain conformance with exposure limits, in band measurements may be performed. A method, a computer-readable medium, and an apparatus may be provided for wireless communication at a user equipment. The apparatus receives an indication of a cell specific resource, e.g., a cell specific resource available for MPE measurement. The apparatus then performs a measurement based on the cell specific resource and determines whether to adjust a transmission characteristic of the user equipment based on whether the measurement meets a threshold. In another aspect a base station apparatus may configure a cell specific resource in which a user equipment may perform an MPE measurement and control use of the cell specific resource for the MPE measurement.

111 Claims, 13 Drawing Sheets

(51) Int. Cl.
*H04W 52/24* (2009.01)
*H04W 72/04* (2009.01)
*H04W 52/36* (2009.01)
*H04W 52/14* (2009.01)
*H04W 52/22* (2009.01)
*H04B 17/318* (2015.01)
*H04W 24/10* (2009.01)
*H04W 24/02* (2009.01)

(52) U.S. Cl.
CPC ......... *H04W 24/10* (2013.01); *H04W 52/146* (2013.01); *H04W 52/223* (2013.01); *H04W 52/242* (2013.01); *H04W 52/36* (2013.01); *H04W 72/0446* (2013.01); *H04W 24/02* (2013.01); *H04W 72/042* (2013.01); *H04W 72/046* (2013.01)

(58) Field of Classification Search
CPC .......... H04B 17/14; H04B 17/21; H04B 1/04; H04B 2001/0408; H04B 7/0408; H04B 7/0465; H04B 7/0691; H04B 7/0814; H04B 7/0874; H04B 7/0897; H04W 52/242; H04W 72/042; H04W 72/0446; H04W 72/046; H04W 72/085; H04W 24/02; H04W 24/10; H04W 52/146; H04W 52/223; H04W 52/36; H04W 88/02; H04W 88/08; Y02D 30/70
See application file for complete search history.

(56) References Cited

U.S. PATENT DOCUMENTS

| | | | | |
|---|---|---|---|---|
| 9,647,740 B1* | 5/2017 | Black | | H04W 52/24 |
| 11,067,635 B2* | 7/2021 | Srinivasan | | G01R 31/389 |
| 2003/0117980 A1* | 6/2003 | Kim | | H04W 36/0094 |
| | | | | 370/332 |
| 2004/0109424 A1* | 6/2004 | Chheda | | H04W 72/1278 |
| | | | | 370/331 |
| 2004/0218533 A1* | 11/2004 | Kim | | H04L 1/0002 |
| | | | | 370/235 |
| 2005/0272432 A1* | 12/2005 | Ji | | H04W 72/082 |
| | | | | 455/449 |
| 2007/0046539 A1* | 3/2007 | Mani | | H01Q 3/26 |
| | | | | 342/383 |
| 2008/0062925 A1* | 3/2008 | Mate | | H04W 52/244 |
| | | | | 370/331 |
| 2008/0072269 A1* | 3/2008 | Malladi | | H04W 48/12 |
| | | | | 725/110 |
| 2008/0268859 A1* | 10/2008 | Lee | | H04W 72/0426 |
| | | | | 455/450 |
| 2008/0274742 A1* | 11/2008 | Bi | | H04W 36/0088 |
| | | | | 455/437 |
| 2009/0086673 A1* | 4/2009 | Aminaka | | H04W 74/008 |
| | | | | 370/329 |
| 2009/0225709 A1* | 9/2009 | Wager | | H04W 72/0413 |
| | | | | 370/329 |
| 2010/0020714 A1* | 1/2010 | Rosik | | H04W 36/0088 |
| | | | | 370/252 |
| 2010/0034126 A1* | 2/2010 | Kitazoe | | H04W 74/085 |
| | | | | 370/310 |
| 2010/0034158 A1* | 2/2010 | Meylan | | H04L 1/1854 |
| | | | | 370/329 |
| 2010/0203862 A1* | 8/2010 | Friedlander | | H04B 17/318 |
| | | | | 455/404.1 |
| 2010/0261469 A1* | 10/2010 | Ribeiro | | H04W 99/00 |
| | | | | 455/423 |
| 2010/0285809 A1* | 11/2010 | Lindstrom | | H04L 5/001 |
| | | | | 455/450 |
| 2010/0323633 A1* | 12/2010 | Pani | | H04W 24/10 |
| | | | | 455/67.14 |
| 2011/0002371 A1* | 1/2011 | Forenza | | H04B 17/309 |
| | | | | 375/227 |
| 2011/0044193 A1* | 2/2011 | Forenza | | H04B 7/024 |
| | | | | 370/252 |
| 2011/0059706 A1* | 3/2011 | Harel | | H04B 1/3838 |
| | | | | 455/115.1 |
| 2011/0096815 A1* | 4/2011 | Shin | | H04W 52/146 |
| | | | | 375/219 |
| 2011/0313651 A1* | 12/2011 | Hyde | | G08B 3/10 |
| | | | | 701/400 |
| 2012/0021707 A1* | 1/2012 | Forrester | | H04W 52/30 |
| | | | | 455/103 |
| 2012/0021800 A1* | 1/2012 | Wilson | | H04W 52/146 |
| | | | | 455/550.1 |
| 2012/0082052 A1* | 4/2012 | Oteri | | H04W 24/10 |
| | | | | 370/252 |
| 2012/0113914 A1* | 5/2012 | Zhao | | H04L 5/0007 |
| | | | | 370/329 |
| 2012/0142291 A1* | 6/2012 | Rath | | H04B 7/0602 |
| | | | | 455/127.1 |
| 2012/0147801 A1* | 6/2012 | Ho | | H04W 52/365 |
| | | | | 370/311 |
| 2012/0231784 A1* | 9/2012 | Kazmi | | H04W 36/0072 |
| | | | | 455/423 |
| 2012/0258672 A1* | 10/2012 | Hochwald | | H04B 7/0617 |
| | | | | 455/67.14 |
| 2012/0281567 A1* | 11/2012 | Gao | | H04B 7/0626 |
| | | | | 370/252 |
| 2012/0282889 A1* | 11/2012 | Tanaka | | H04J 11/0053 |
| | | | | 455/405 |
| 2012/0287875 A1* | 11/2012 | Kim | | H04W 76/27 |
| | | | | 370/329 |
| 2012/0315859 A1* | 12/2012 | Lee | | H04L 5/0051 |
| | | | | 455/67.13 |
| 2013/0122827 A1* | 5/2013 | Ali | | H04B 1/3838 |
| | | | | 455/77 |
| 2013/0136015 A1* | 5/2013 | Ojala | | H04L 5/0053 |
| | | | | 370/252 |
| 2013/0176953 A1* | 7/2013 | Stern-Berkowitz | | H04W 52/146 |
| | | | | 370/329 |
| 2013/0188499 A1* | 7/2013 | Mach | | H04W 48/20 |
| | | | | 370/252 |
| 2013/0201932 A1* | 8/2013 | Ko | | H04L 1/0061 |
| | | | | 370/329 |
| 2013/0208694 A1* | 8/2013 | Park | | H04W 74/004 |
| | | | | 370/329 |
| 2013/0223271 A1* | 8/2013 | Huang | | H04W 72/02 |
| | | | | 370/252 |
| 2013/0250925 A1* | 9/2013 | Lohr | | H04W 56/0045 |
| | | | | 370/336 |
| 2013/0260741 A1* | 10/2013 | Yamada | | H04W 24/00 |
| | | | | 455/422.1 |
| 2013/0267221 A1* | 10/2013 | Srinivasan | | H04W 36/0085 |
| | | | | 455/422.1 |
| 2013/0311792 A1* | 11/2013 | Ponnathota | | G06F 1/26 |
| | | | | 713/300 |
| 2013/0315075 A1* | 11/2013 | Tamura | | H04W 76/19 |
| | | | | 370/242 |
| 2014/0044023 A1* | 2/2014 | Kazmi | | H04W 28/18 |
| | | | | 370/278 |
| 2014/0080509 A1* | 3/2014 | Siomina | | H04W 64/00 |
| | | | | 455/456.1 |
| 2014/0119344 A1* | 5/2014 | Zhang | | H04W 72/1231 |
| | | | | 370/336 |
| 2014/0146697 A1* | 5/2014 | Kim | | H04B 7/0413 |
| | | | | 370/252 |
| 2014/0148172 A1* | 5/2014 | Brisebois | | H04W 72/082 |
| | | | | 455/438 |
| 2014/0153661 A1* | 6/2014 | Hochwald | | H04B 7/0617 |
| | | | | 375/267 |
| 2014/0169234 A1* | 6/2014 | Zhu | | H04W 72/082 |
| | | | | 370/277 |
| 2014/0187281 A1* | 7/2014 | Faraone | | H04W 52/288 |
| | | | | 455/522 |

(56) References Cited

U.S. PATENT DOCUMENTS

| | | | |
|---|---|---|---|
| 2014/0254564 A1* | 9/2014 | Khude | H04W 16/10 370/336 |
| 2014/0293953 A1* | 10/2014 | Seo | H04W 24/10 370/329 |
| 2014/0313041 A1* | 10/2014 | Tesanovic | H04B 1/3838 340/657 |
| 2014/0362701 A1* | 12/2014 | Roh | H03M 13/2966 370/235 |
| 2015/0011236 A1* | 1/2015 | Kazmi | G01S 5/0226 455/456.1 |
| 2015/0023191 A1* | 1/2015 | Kim | H04W 56/0015 370/252 |
| 2015/0085805 A1* | 3/2015 | Li | H04W 72/121 370/329 |
| 2015/0109969 A1* | 4/2015 | Celebi | H04L 5/0085 370/278 |
| 2015/0111608 A1* | 4/2015 | Kazmi | H04W 52/281 455/522 |
| 2015/0119062 A1* | 4/2015 | Aoki | H04W 72/082 455/452.1 |
| 2015/0133137 A1* | 5/2015 | Lee | H04W 72/0486 455/452.1 |
| 2015/0215107 A1* | 7/2015 | Siomina | H04W 24/10 370/281 |
| 2015/0288074 A1* | 10/2015 | Harper | H01Q 1/243 343/833 |
| 2015/0289256 A1* | 10/2015 | Shi | H04W 74/006 370/329 |
| 2015/0358977 A1* | 12/2015 | Seo | H04L 5/1469 455/452.1 |
| 2015/0358979 A1* | 12/2015 | Puranik | H04B 1/3838 455/452.2 |
| 2016/0135181 A1* | 5/2016 | Nogami | H04W 24/08 370/329 |
| 2016/0329981 A1* | 11/2016 | Chung | H04W 72/042 |
| 2016/0337916 A1* | 11/2016 | Deenoo | H04W 36/0088 |
| 2017/0012748 A1* | 1/2017 | Dabeer | H04W 74/0816 |
| 2017/0013411 A1* | 1/2017 | Steiner | H04W 4/38 |
| 2017/0013641 A1* | 1/2017 | Patel | H04L 1/0027 |
| 2017/0034748 A1* | 2/2017 | Yoon | H04W 36/02 |
| 2017/0055202 A1* | 2/2017 | Uchiyama | H04W 24/10 |
| 2017/0063417 A1* | 3/2017 | Butner | H04B 1/3838 |
| 2017/0118686 A1 | 4/2017 | Fang et al. | |
| 2017/0134131 A1* | 5/2017 | Sharma | H04B 7/0617 |
| 2017/0135046 A1* | 5/2017 | Sutskover | H04W 52/242 |
| 2017/0202025 A1* | 7/2017 | Ouchi | H04W 16/32 |
| 2017/0205535 A1* | 7/2017 | Wang | G01S 7/021 |
| 2017/0223738 A1* | 8/2017 | Seo | H04W 74/08 |
| 2017/0257878 A1* | 9/2017 | Kazmi | H04L 5/0037 |
| 2017/0265230 A1* | 9/2017 | Liu | H04W 74/0841 |
| 2017/0270536 A1* | 9/2017 | Williams | H04W 76/10 |
| 2017/0273109 A1* | 9/2017 | Babaei | H04W 74/0808 |
| 2017/0290031 A1* | 10/2017 | Hwang | H04W 72/14 |
| 2017/0347270 A1* | 11/2017 | Iouchi | H04W 16/14 |
| 2018/0006774 A1* | 1/2018 | Yiu | H04L 5/0091 |
| 2018/0027549 A1* | 1/2018 | Wang | H04L 5/0057 370/329 |
| 2018/0034598 A1* | 2/2018 | Yiu | H04W 24/10 |
| 2018/0049047 A1* | 2/2018 | Lin | H04W 24/02 |
| 2018/0049080 A1* | 2/2018 | Zhang | H04W 4/70 |
| 2018/0049245 A1* | 2/2018 | Islam | H04B 7/0619 |
| 2018/0054749 A1* | 2/2018 | Kim | H04W 36/00837 |
| 2018/0054794 A1* | 2/2018 | Cariou | H04W 64/00 |
| 2018/0063736 A1* | 3/2018 | Sadeghi | H04W 24/10 |
| 2018/0077547 A1* | 3/2018 | Sanchez Barajas | H04B 7/04 |
| 2018/0152957 A1* | 5/2018 | Zhang | H04B 17/24 |
| 2018/0166924 A1* | 6/2018 | Hosseini | H02J 7/025 |
| 2018/0175992 A1* | 6/2018 | Froberg | H04L 5/0057 |
| 2018/0176926 A1* | 6/2018 | Xu | H04W 28/0231 |
| 2018/0184316 A1* | 6/2018 | Zhang | H04W 24/08 |
| 2018/0192371 A1* | 7/2018 | Jung | H04W 72/046 |
| 2018/0192426 A1* | 7/2018 | Ryoo | H04W 24/10 |
| 2018/0198646 A1* | 7/2018 | Gau | H04L 5/00 |
| 2018/0219663 A1* | 8/2018 | Lin | H04L 5/0053 |
| 2018/0220458 A1* | 8/2018 | Ouchi | H04J 11/00 |
| 2018/0242291 A1* | 8/2018 | Moon | H04L 1/1854 |
| 2018/0248642 A1* | 8/2018 | Si | H04L 5/0053 |
| 2018/0249439 A1* | 8/2018 | Xu | H04W 68/02 |
| 2018/0302138 A1* | 10/2018 | Shirakata | H04B 7/0417 |
| 2018/0316474 A1* | 11/2018 | Mukherjee | H04W 72/042 |
| 2018/0324022 A1* | 11/2018 | Sheng | H04L 5/0094 |
| 2018/0331714 A1* | 11/2018 | See | H04B 1/44 |
| 2018/0332608 A1* | 11/2018 | Guo | H04W 72/1289 |
| 2018/0376339 A1* | 12/2018 | Hu | H04W 16/14 |
| 2019/0014514 A1* | 1/2019 | Sundberg | H04W 36/08 |
| 2019/0021017 A1* | 1/2019 | Nagaraja | H04W 24/10 |
| 2019/0028978 A1* | 1/2019 | Yasukawa | H04W 52/383 |
| 2019/0028980 A1* | 1/2019 | Feuersaenger | H04W 52/281 |
| 2019/0045524 A1* | 2/2019 | Pettersson | H04W 74/02 |
| 2019/0053174 A1* | 2/2019 | Nangia | H04W 76/27 |
| 2019/0090185 A1* | 3/2019 | Rune | H04B 7/0617 |
| 2019/0110254 A1* | 4/2019 | Yerramalli | H04W 52/0251 |
| 2019/0110310 A1* | 4/2019 | Obregon | H04W 72/1284 |
| 2019/0116613 A1* | 4/2019 | Abedini | H04W 74/0833 |
| 2019/0132793 A1* | 5/2019 | Lin | H04W 52/0274 |
| 2019/0150199 A1* | 5/2019 | Cho | H04L 27/2662 370/329 |
| 2019/0158337 A1* | 5/2019 | Yoon | H04L 27/2692 |
| 2019/0159203 A1* | 5/2019 | Kim | H04L 5/00 |
| 2019/0173634 A1* | 6/2019 | Teyeb | H04L 5/0032 |
| 2019/0191279 A1* | 6/2019 | Fujishiro | H04W 4/06 |
| 2019/0191332 A1* | 6/2019 | Kim | H04L 69/04 |
| 2019/0200379 A1* | 6/2019 | Wang | H04W 72/1289 |
| 2019/0215802 A1* | 7/2019 | Wager | H04W 72/02 |
| 2019/0215867 A1* | 7/2019 | Cheng | H04W 52/0225 |
| 2019/0223065 A1* | 7/2019 | Lu | H04W 36/0072 |
| 2019/0296838 A1* | 9/2019 | Hessler | H04L 5/0051 |
| 2019/0349873 A1* | 11/2019 | Ohara | H04W 52/36 |
| 2020/0389856 A1* | 12/2020 | Yao | H04B 1/3838 |

OTHER PUBLICATIONS

Interdigital: "NSA and NR-UE Maximum Output Power", R4-1700446, TSG-RAN Working Group 4 (Radio) Meeting #82, 10.4.2.3, Athens, GR, Feb. 13-17, 2017, pp. 1-7.

Plets D., et al., "Prediction and Comparison of Downlink Electric-Field and Uplink Localized SAR Values for Realistic Indoor Wireless Planning", Radiation Protection Dosimetry, 2013, pp. 1-14.

International Search Report and Written Opinion—PCT/US2018/066393—ISA/EPO—dated Mar. 6, 2019.

Taiwan Search Report—TW107146110—TIPO—dated Jan. 22, 2022.

* cited by examiner

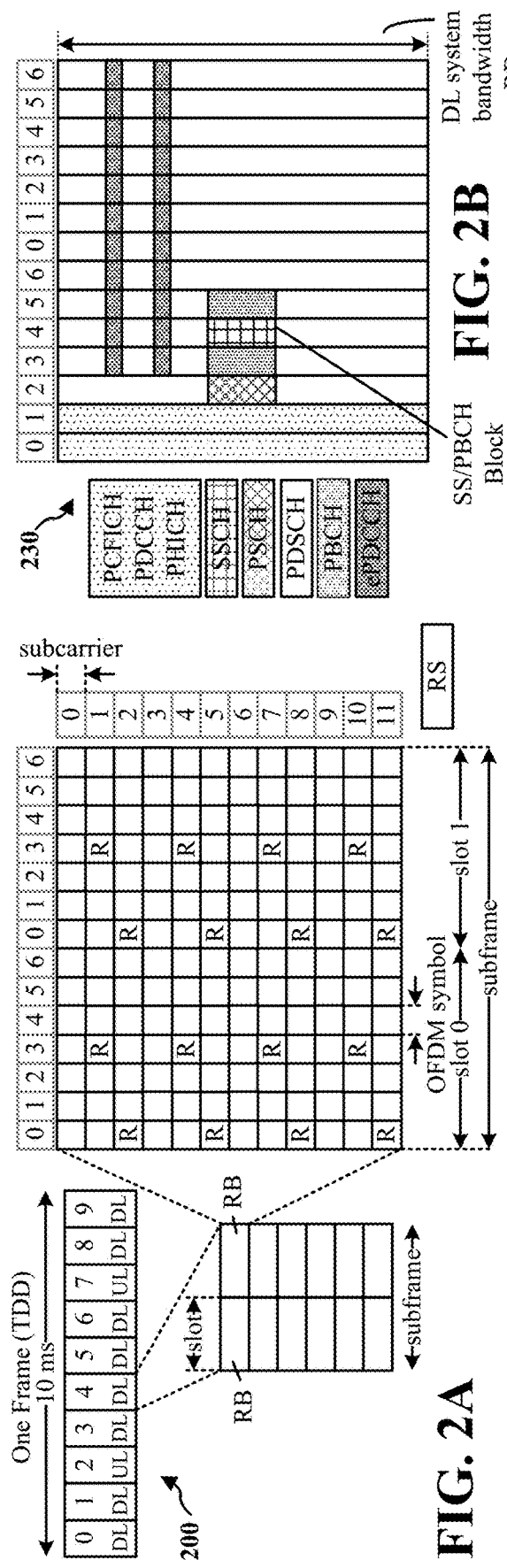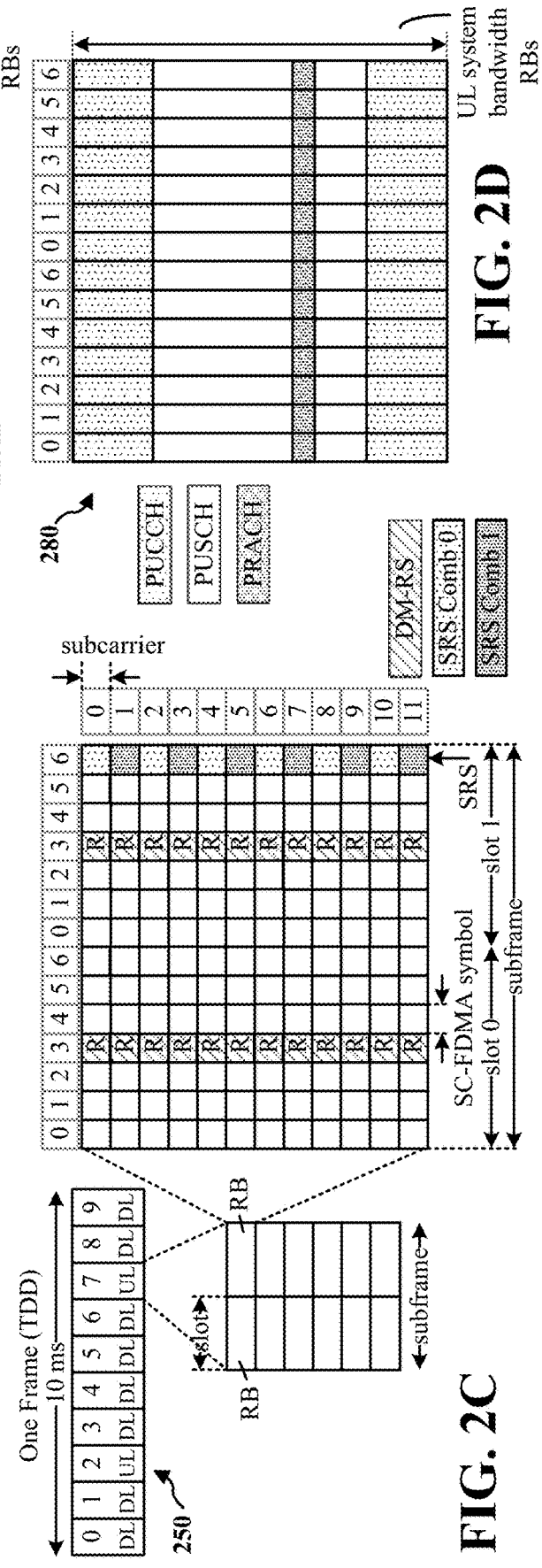

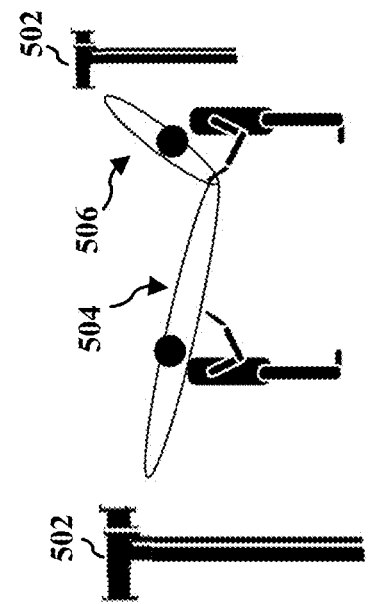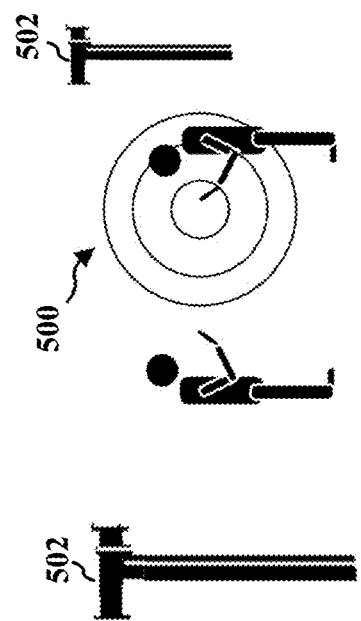
FIG. 5

EXPOSURE DETECTION IN MILLIMETER WAVE SYSTEMS

BACKGROUND

Technical Field

The present disclosure relates generally to communication systems, and more particularly, to exposure detection in millimeter wave (mmW) wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G may be based on the 4G Long Term Evolution (LTE) standard. There exists a need for further improvements in 5G technology. These improvements may also be applicable to other multi-access technologies and the telecommunication standards that employ these technologies.

Exposure limits are imposed to limit Radio Frequency (RF) radiation from wireless devices. For example, a specific absorption rate (SAR) limit is imposed for wireless devices communicating in a sub-6 carrier, e.g., communicating in a spectrum band below 6 GHz. A Maximum Permissible Exposure (MPE) limit is imposed for wireless devices communicating above 6 GHz. With the high path loss in mmW systems, a higher Equivalent Isotropically Radiated Power (EIRP) may be desired, which may be achieved through beam steering. However, a mmW beam from a handheld device might violate an MPE limit when directed toward a person's body.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As free space and other losses for mmW systems are much higher than in systems communicating in sub-6 carriers, a higher EIRP for transmissions is typically desired. A higher EIRP may be accomplished by using antenna arrays to steer the beam in a desired direction. While a user equipment design may practically operate at much lower than EIRP limits, there may be a problem in which a beam pointed towards a person skin by handheld device could violate the MPE limits, even while meeting the EIRP limits.

Static power limits to ensure that MPE limits are met at all times could require substantial back-off in power leading to a poor uplink range. Therefore, a UE may measure exposure and respond in a variety of ways to ensure conformance. For example, the UE may perform an in band exposure measurement to detect the presence of a person, e.g., a hand or other body part. However, an in band measurement may cause interference to data or control transmissions within the communication system. Additionally, in band measurements may be inaccurate due to other transmissions in the communication system. In order to make accurate exposure measurements without causing interference to other transmissions within the communication system, the UE may make a measurement based on a cell specific resource for MPE measurements. The UE may then determine whether to adjust a transmission characteristic based on the measurement.

In an aspect of the disclosure, a method, a computer-readable medium, and an apparatus are provided for wireless communication at a user equipment. The apparatus receives an indication of a comprising a cell specific resource, e.g., a cell specific resource available for MPE measurement. The apparatus then performs a measurement based on the cell specific resource and determines whether to adjust a transmission characteristic of the user equipment based on whether the measurement meets a threshold.

In another aspect of the disclosure, a method, a computer-readable medium, and an apparatus are provided for wireless communication at a base station. The apparatus configures a cell specific resource in which a user equipment may perform an MPE measurement and controls use of the cell specific resource for the MPE measurement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

FIG. 5 is a diagram illustrating RF exposure in different communication systems.

DETAILED DESCRIPTION

Figure 1:
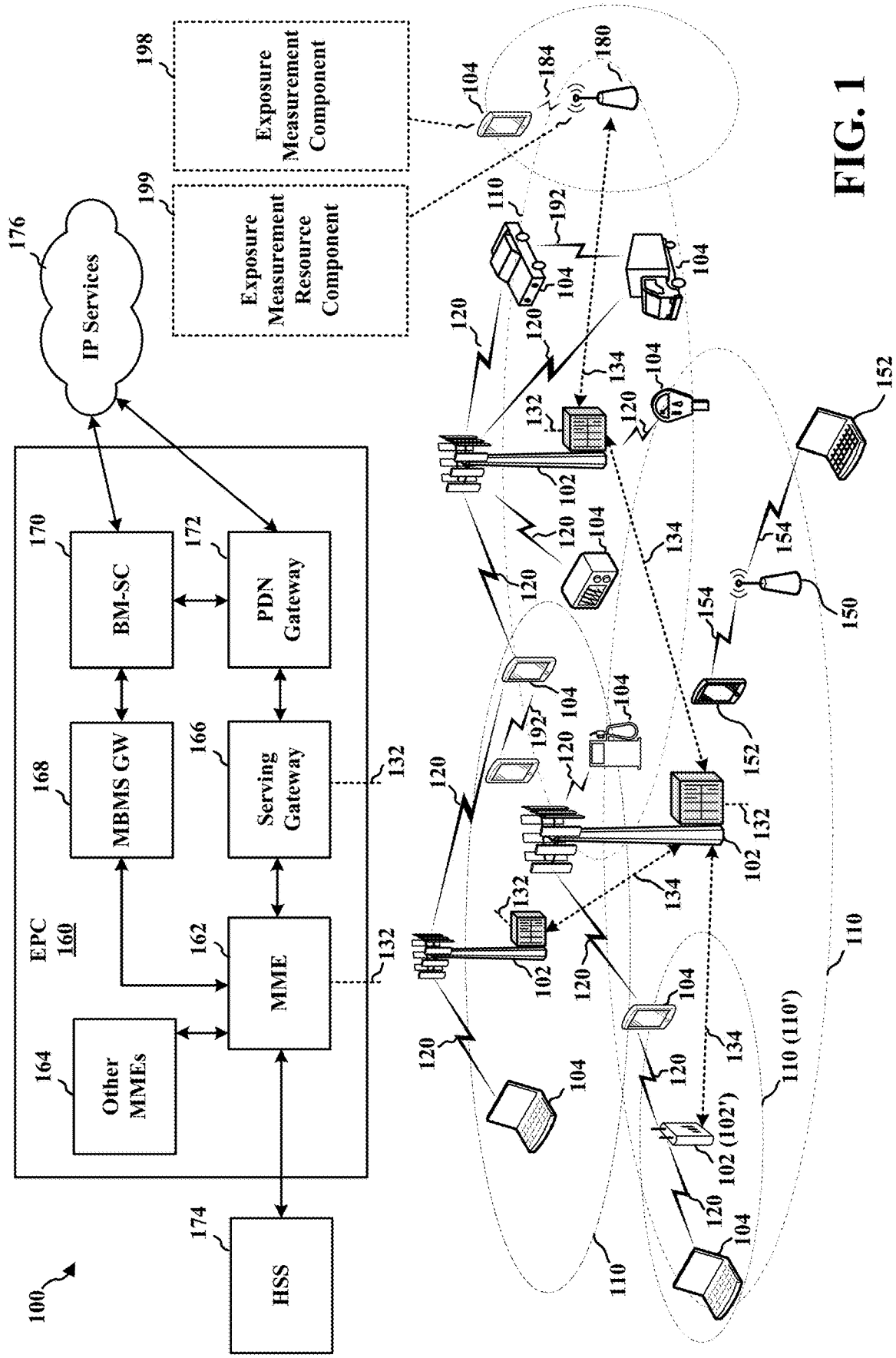
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ 5G and use the same 5 GHz unlicensed frequency spectrum as used by the Wi-Fi AP 150. The small cell 102', employing 5G in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured with an exposure measurement component 198 configured to perform exposure measurement, e.g., as described in connection with FIGS. 5-10. In certain aspects, the base station 180 may be configured with an exposure measurement resource component 199 to configure a cell specific resource for exposure measurement and/or control use of the cell specific resource for exposure measurement, e.g., as described in connection with FIGS. 5-7 and 11-13.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^\mu*15$ kKz, where p is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
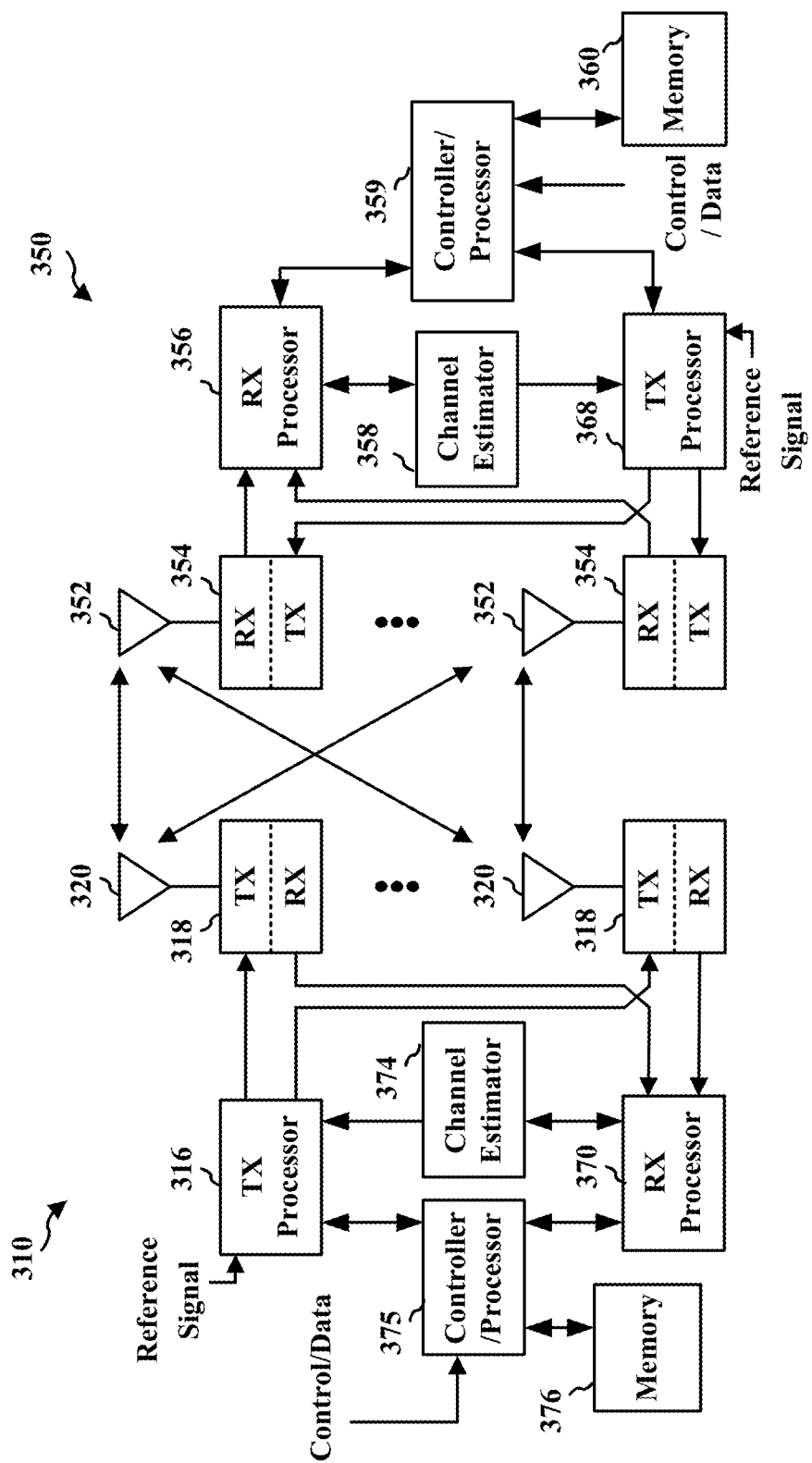
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
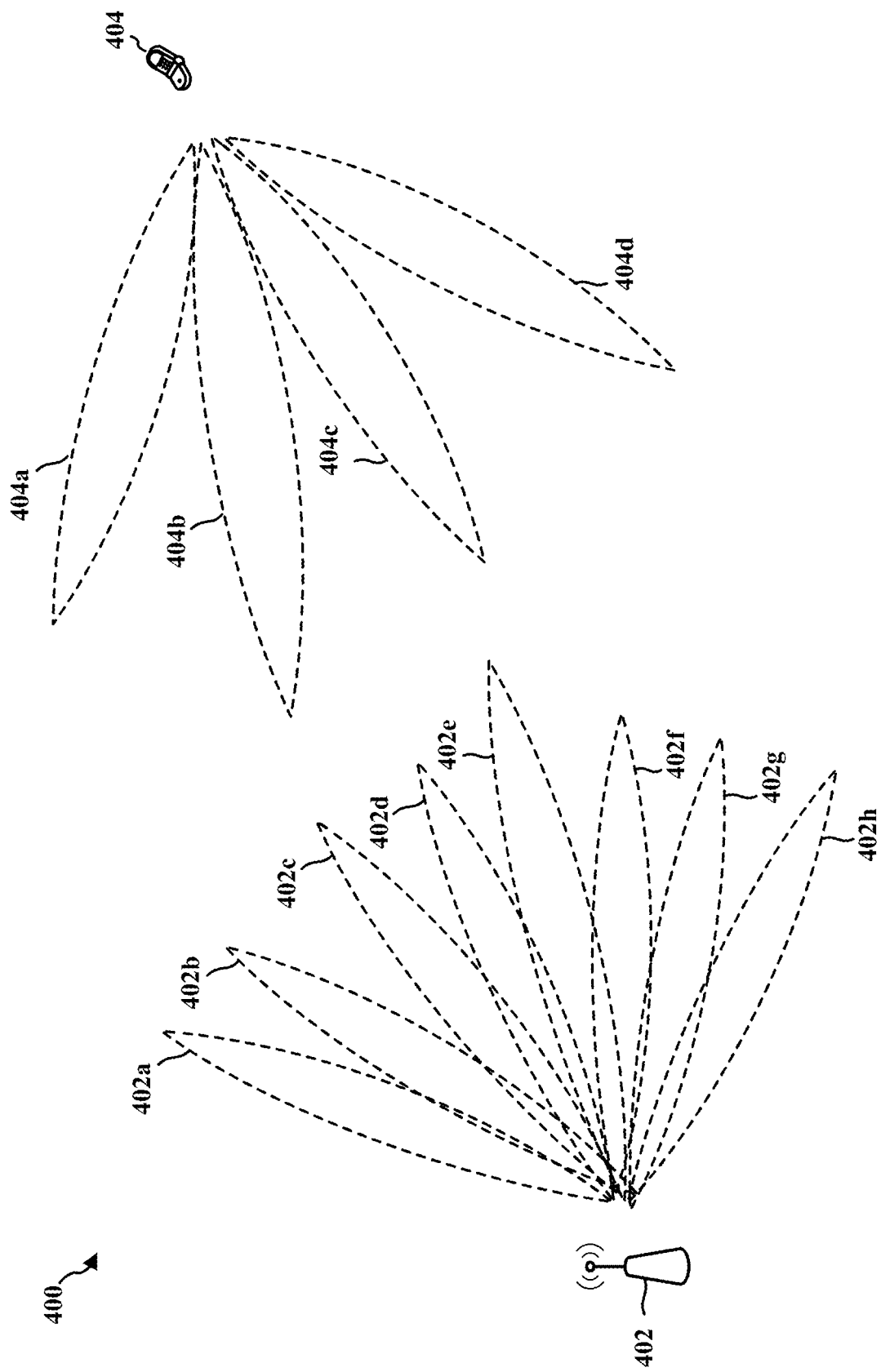
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 6:
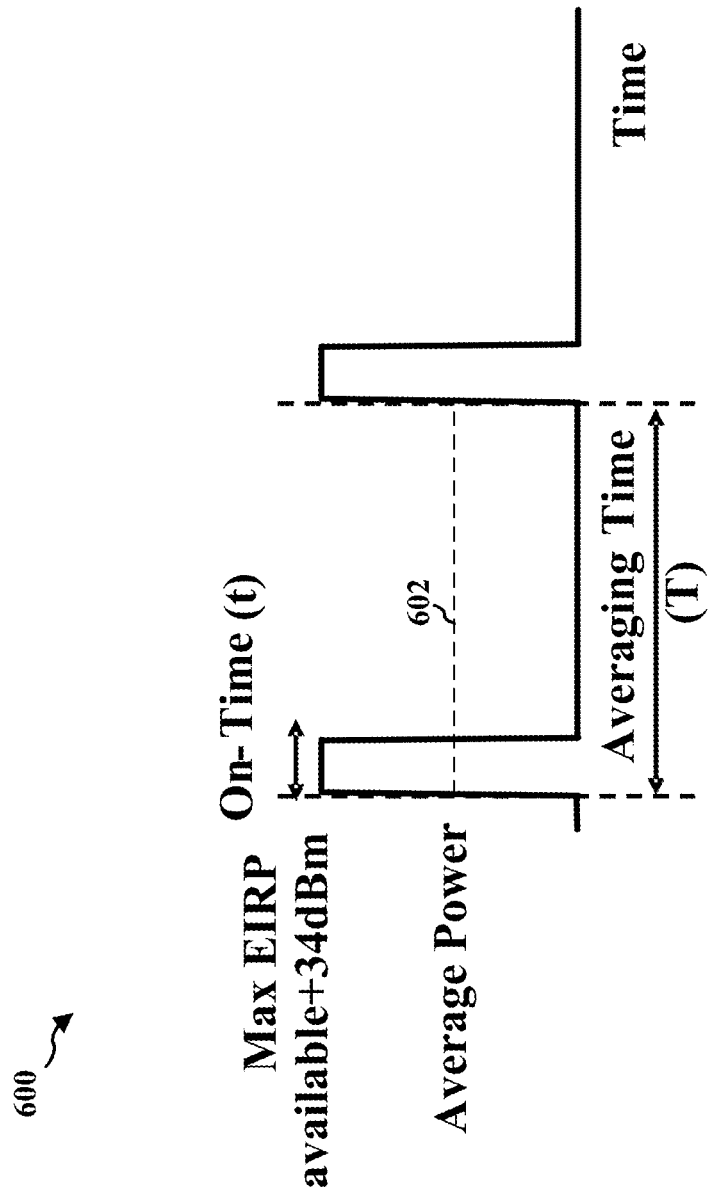
FIG. 6 illustrates an example of exposure measurement.

Exposure limits are imposed to limit RF radiation from wireless devices. For example, an SAR limit is imposed for wireless devices communicating in a sub-6 carrier. The transmission in a sub-6 carrier system may be close to isotropic and may have a low path loss. The SAR regulatory metric for exposure is a volume metric, e.g., expressed as a power per unit volume. In contrast, an MPE limit is imposed for wireless devices communicating above 6 GHz. The MPE limit is a regulatory metric for exposure based on area, e.g., a limit defined as a number, X, $W/m^2$ averaged over a defined area and time averaged over a frequency dependent time window in order to prevent a human exposure hazard represented by a tissue temperature change. The higher frequencies above 6 GHz interact with a person's skin surface while the lower frequencies below 6 GHz can be absorbed in volume. An exposure limitation may be indicated for whole body exposure and/or for localized exposure. Exposure limits may be based on an average amount of exposure for a defined time window. An example MPE limit for mmW systems is 1 mW/cm$^2$. Thus, this limit may indicate that a power density hitting a person may not exceed 1 mW/cm$^2$. Another example limit may be 20 mW/20 cm$^2$, e.g., in which the power density needs to be met over a wider area. For a UE, an average MPE measurement may be used, e.g., using a duty-cycle. FIG. 6 illustrates an example of averaging 600 exposure for a transmission during a time, t, that is only a portion of the averaging time window, T. The transmission may be transmitted at a Max EIRP+x dBM and will lead to the indicated average power 602 when averaged over the averaging time T. This allows the UE to transmit at max EIRP+x dBM for a short period of time within the averaging window so that the average power over the averaging window will be less than the max EIRP.

As free space and other losses for mmW systems are much higher than for sub-6 carrier systems, a higher EIRP for transmissions is typically desired. A higher EIRP may be accomplished by using antenna arrays to steer a beam in a desired direction, e.g., as with the example beamforming described in connection with FIG. 4. An example EIRP limit for UE devices in a mmW system, e.g., 24 GHz-60 GHz system, may be 43 dBm. For transportable devices, such as Customer Premises Equipment (CPE), the limit may be higher, e.g., 55 dBm. While a typical UE may operate below the 43 dBm limit, e.g., in the range of 26-34 dBm, there may be a problem in which a transmission beam pointed towards a person's skin could violate the MPE limits. Thus, even while meeting the EIRP limits, a mmW beam from a handheld device might violate an MPE limit when the mmW beam is directed toward a person's body. FIG. 5 illustrates handheld wireless devices wirelessly communicating with base stations 502. A first handheld device emits a transmission 500 that is close to isotropic, and a second handheld device wirelessly communicate with base station(s) 502 using beam forming, e.g., with beams 504, 506. For the second handheld device, energy may be concentrated in the beam direction, e.g., 504, 506, through the use of multiple antenna elements transmitting in a manner to constructively add in a particular direction.

Static power limits for transmissions from UEs may ensure that MPE limits are met at all times. However, such static power limits could require substantial back-off in power at the UE and may lead to a poor uplink range for the UE. A static power back off rule may be based on a distance at which a detector can measure an MPE violation. In order to ensure that the UE maintains conformance with exposure limits while providing an effective range, a UE may perform exposure measurements to detect actual exposure conditions. When the UE determines a problematic exposure condition, the UE may respond in any of a variety of ways to ensure conformance with the exposure limits. The UE may reduce transmission power and/or switch antenna arrays in response to detecting an exposure condition that would violate the limit.

Thus, the UE may perform an in band exposure measurement, e.g., an MPE measurement, to detect the presence of a person, e.g., a hand or other body part in a particular beam direction. One example of an MPE measurement may be made using a frequency modulated continuous wave radar measurement. For example, the UE may transmit a radio signal with at least one antenna element and the receiver may detect echoes from objects in the path of the signal. This detection may enable the UE to detect an obstruction and a distance to the obstruction. The UE may respond based on the assumption that the obstruction is a portion of a person's body in the path of a transmission from the antenna. Example detection methods include xpol and radar. In the radar example, the radar signal may sweep the signal in frequency over a wide bandwidth and may radiate in the band in which the UE will communicate with a base station. In the x pol example, the transmission may include only a single tone rather than a wideband signal.

However, such an in band exposure measurement may cause interference to data or control transmissions within the communication system. Additionally, in band measurements may be inaccurate due to other transmissions in the communication system. In order to make accurate exposure measurements without causing interference to other transmissions within the communication system, the UE may make an exposure measurement based on resources that avoid interference to other data/control transmissions. For example, the resources may comprise a cell specific resource available for MPE measurements. Determinations may be made by the UE or by the network to manage interference that UEs performing measurements may cause to each other and to other data/control transmissions. The UE may then determine whether to adjust a transmission characteristic based on the exposure measurement.

Multiple UEs making simultaneous MPE measurements may lead to interference among each other and inaccurate MPE measurements. However, the power levels for MPE measurement are generally low. Furthermore, measurement occasions for UEs can be randomized over the cell specific resource occurrences in order to limit this interference. Additionally, while a false detection of MPE meeting the limit may lead to inefficiency, it may not be catastrophic.

System Wide Gap

One example of a resource for MPE measurement is a system-wide gap. However, a system wide gap for MPE measurement may lead to system inefficiencies, e.g., if the system wide gap needs to be used frequently by the UEs. Such a system wide gap may cause many UEs to take a measurement at the same time, e.g., leading to inaccurate/noisy measurements. The inaccuracy may be improved by randomizing a burst load of MPE measurements. Thus, MPE transmission signals may be randomized over different system wide resources. In this example, UE may be configured to randomize their MPE measurements among a plurality of system wide gap occasions. By randomizing the MPE transmission signals rather than using a selected sub-set of resources may help to avoid high levels of interference. The randomization may improve system inefficiency by improving the accuracy of the MPE measurements and avoiding false detection of an exposure condition.

An Unscheduled Resource

In another example, the UE may make the measurement based on an existing resource opportunity that will enable the UE to make a measurement without significantly disrupting system operation and performance. In 5G systems, dynamic TDD may be employed. Thus, data resources can be dynamically configured to be uplink or downlink based on control channel indications. In this example, the UE may use a resource during which it has not been scheduled for downlink or uplink data to make an MPE measurement. Although a UE may determine, upon decoding a control channel, that the UE has not been scheduled for data in a resource, it might not be desirable to reuse the resource because another downlink or uplink transmission in the cell may lead to inaccuracies in the MPE measurement. Similarly, MPE measurements during resources carrying downlink synchronization signals may lead to inaccuracies in the MPE measurement.

Gap Period

In another example, the UE may use a gap period between downlink and uplink resources to make the MPE measurement. Use of the gap period may lead to inefficiency in MPE measurement, e.g., because when the UE is scheduled for downlink data, the UE must first complete the reception of the downlink data. Thus, depending on the UE's distance from the base station, the reception delay may consume a portion of the gap period before the UE can commence with an MPE measurement. Additionally, when the UE has to send an uplink control channel, a further restriction is placed on the ability to measure during the gap period. As well, another UE located further away in the cell may perform timing advanced transmission leading to interfered and inaccurate MPE measurement. The UE may receive transmissions from distant base stations that are coarsely synchronized even after the UE has entered the gap period, thereby leading to an interfered, inaccurate MPE measurement.

MPE detection resource may be located in guard tones between RACH resources or in guard tones between RACH resources and data/control resources. For example, RACH resources may use 139 tones in communication over 6 GHz. However, 144 tones may be reserved for RACH bandwidth in communication systems over 6 GHz. In this example, there will be 5 guard tones around the actual RACH sequence that may be available for MPE measurement.

Cell Specific Resource

In another example, the UE may perform the MPE measurement during a cell specific resource that is available for MPE measurement. Examples of a cell specific resource include any of a RACH resource, a beam failure recovery resource, or a scheduling request (SR) resource. A resource may comprise a downlink resource or a synchronization signal (SS) resource.

Figure 7:
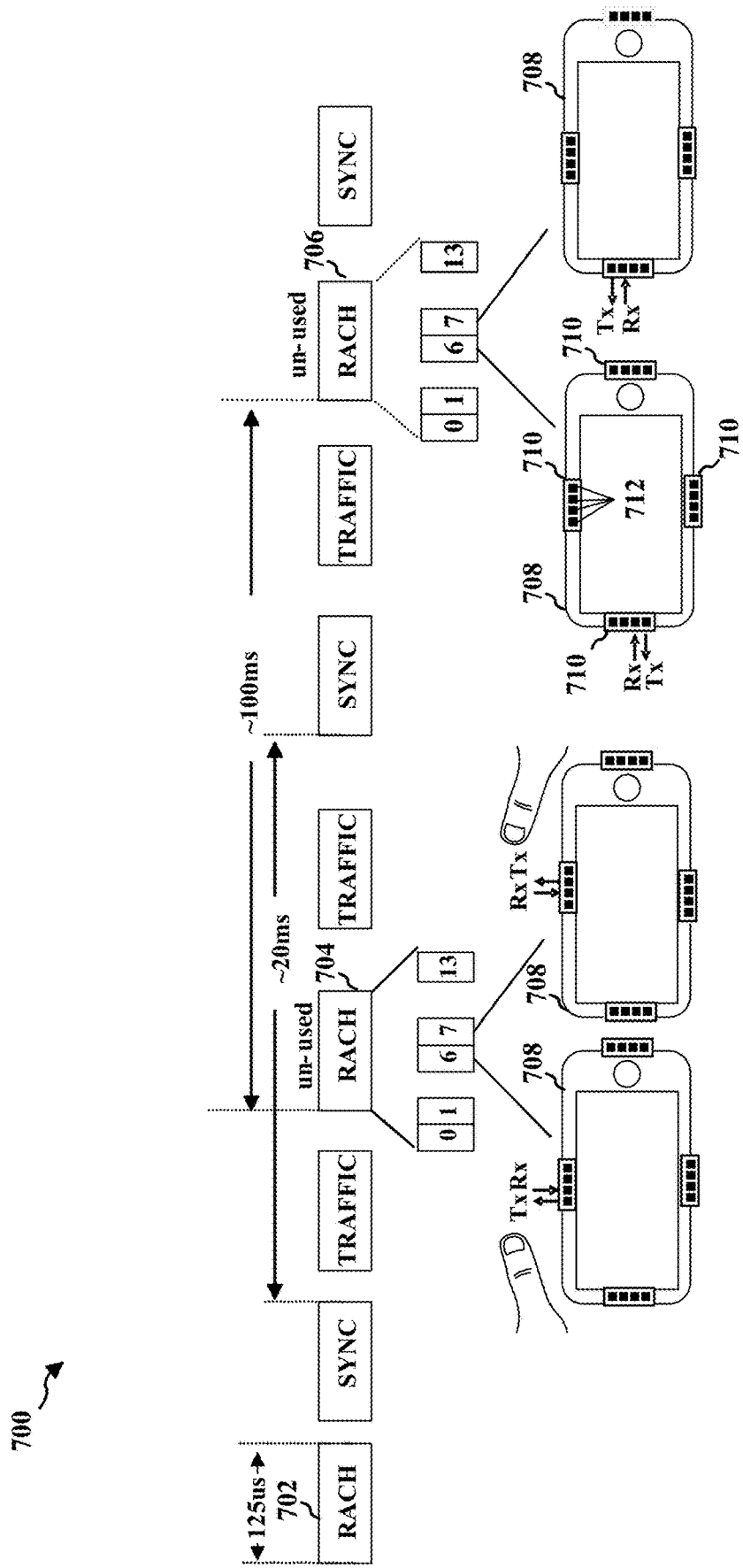
FIG. 7 illustrates an example of in band exposure measurement.

Examples will be described in connection with the RACH example. However, aspects may similarly be applied to a beam failure recovery resource or a scheduling request resource. FIG. 7 illustrates an example of MPE measurement 700 performed during unused RACH resources 704 and 706. RACH resource 702 might not be used for MPE measurement, e.g., when the UE needs the resource for RACH, when the UE determines autonomously not to perform a measurement during the RACH resource, or when the UE receives an indication to refrain from performing an MPE measurement during the RACH resource 702. As illustrated in FIG. 7, MPE measurements may be performed using different antenna sub arrays. The example device 708 in FIG. 7 has four antenna modules 710, each antenna module comprising multiple elements 712, also referred to as sub arrays. In a given unused RACH subframe, a same antenna module 710 may be used. For example, multiple elements 712 from the same antenna module 710 may be measured to improve detection. Each antenna pair, e.g., a transmitter/receiver pair, may have its own MPE beam index in L1. A single detection method may be employed, e.g., X-pol or radar. For example, L1 may select the detection method to be used. The selection may be based on a comparison of a moving averaged uplink power against a threshold. For Q-pol, the threshold may be less than +24 dBM. For radar, the threshold may be greater than +24 dBm.

For example, a RACH resource is predictably an uplink resource, without concern for downlink transmission interference. The UE may use the RACH resource for MPE measurement when the UE does not need to use the resource for performing RACH or beam access recovery. Use of the RACH resource provides a number of benefits. The RACH resource is predictably a UE transmit occasion in contrast to data resources. The RACH resource is designed for low utilization in order to enable UEs to obtain access to the system quickly and reliably. Thus, the RACH resources should have less inaccuracy in MPE measurement. RACH opportunities occur relatively often, e.g., in comparison to MPE measurement needs. For example, a RACH resource may occur every 5-20 ms. As well, a RACH failure may not be catastrophic, as a randomized retry is typically supported with power ramping. Thus, a UE that fails RACH due to interference caused by MPE measurement should have an opportunity to retry.

While a RACH resource provides a predictable uplink transmit opportunity for MPE measurement, a number of interference issues may apply. In a first example of potential interference, a transmission from another UE may cause interference to the MPE measurement. For example, if a MPE measurement is made using power level of −50 dBm, and the other UE uses a power level of 23 dBm for transmitting a RACH. If the distance between the UE transmitting RACH and UE measuring MPE is 1 m, then at 28 GHz, the interference level will be approximately −38 dBm and MPE detection will fail. Statistically, the chances of interference from another UE RACH transmission are low, because the RACH channel utilization is typically low by design.

Furthermore, this example also assumes that the antenna sub-array for MPE detection is the sub-array experiencing the interference. An MPE signal with a 20 dB attenuation will be received at −70 dBm. A UE simultaneously transmitting RACH at 30 dBm from a distance of about 50 m away will make the SNR of detection around 0 dB. The MPE detection signal may be designed for such a scenario.

A UE may autonomously determine resources for MPE measurement. For example, a UE may perform MPE measurement during any of a resource for which the UE is not scheduled, a system gap, a guard resource, a RACH resource, a beam failure recovery resource, an SR resource, an SS resource, etc. The UE may determine a transmission power for the MPE measurement, e.g., based on downlink path loss values. The UE may perform the MPE measurement using antenna sub-arrays selected based on listening directions of the base station, e.g., based on the UE's knowledge of the base station's listening directions for RACH resources. A sub-array may include a subset of antenna elements within an array of antenna elements. For example, the UE may perform MPE measurement using antenna sub-arrays based on a listening direction of the base station having a reduced quality.

The UE may determine whether to make an MPE measurement based on an interference power detected in a RACH resource, e.g., by listening for interference in a RACH slot. The UE may use the detected interference power as a measurement of system load on the RACH resource. Thus, the UE may determine whether to perform MPE measurement based on a measurement of system load on a particular resource. For example, UE may measure MPE using a RACH resource when system load is measured to be below a threshold. RACH resources may include multiple sub-resources that correspond to different Synchronization Signal (SS) blocks within an SS burst set. The UE may select an SS block, e.g., an SS block having a reduced signal strength, and perform the MPE measurement based on a corresponding RACH sub-resource for the selected SS block. A duration of a RACH resource may be a single slot, multiple slots, or a subset of symbols within a slot. Thus, the UE may select among the resources available for MPE measurement based on resources during which the UE will likely experience and/or cause less interference when performing the MPE measurement.

In other aspects, additional management of the cell specific resource may be employed by the network to control use of the cell specific resource for MPE measurement. Thus, rather than having a UE autonomously determine resources for MPE measurement, a network may control or manage resources used for MPE measurement, e.g., by broadcasting or otherwise signaling indications of resources that may be used for MPE measurement.

In one example, the base station may indicate when RACH occasions, or other available resources, are open for MPE measurement only. In a second example, the base station may indicate that the RACH occasions, or other resources, are available for RACH only. In a third example, the base station may indicate to the UE that the RACH occasions, or other resources, are available for both RACH and MPE measurement. Thus, the network may indicate when an available resource may be used for MPE measurement, and the UE may refrain from using the available resource for MPE measurement unless the indication is received by the network. Alternately, the network may indicate when an available resource may not be used for MPE measurement, and the UE may use the available resource for MPE measurement unless the indication is received by the base station.

The base station may make an indication in any of a MIB, SIB, other system information, MAC CE, DCI, or RRC message. The indication may also be provided to the UE in a message from another carrier, e.g., from an LTE carrier or an 5G sub-6 carrier. For example, a unicast RRC message may be used to indicate to MPE-measuring devices when the devices can or cannot make a measurement in the cell specific resource. In one example, the indication may limit, or otherwise reduce, the use of the resource for MPE measurement.

The network may indicate a rise-over-thermal level that is permitted for MPE measurement for each UE. The network may also indicate a maximum receive power, which indicates the maximum power at which a transmission for MPE measurement from a UE may be received by a base station. The UE may select an SS block and a corresponding RACH sub-resource for MPE measurement to meet maximum receive power limit. For example, the UE may select transmitted SS blocks that the UE cannot detect in order to determine a corresponding resource for MPE measurement.

The network may also explicitly schedule periods for MPE measurement. The scheduled period may be based on an amount of pending uplink data to be transmitted for a UE. Thus, the network may be aware of which UEs have a need to transmit uplink data and may schedule resources for MPE measurement accordingly. In scheduling periods for MPE measurement, the network may group UEs into groups that may perform MPE measurement in a particular resource, e.g., in groups having disparate path loss.

In managing the resources available for MPE measurement, the base station may use a measure of short-term averaged RACH loading to make a determination regarding whether to allow MPE measurement in a RACH resource. There may be a time and spatial correlation in RACH usage, e.g., a greater RACH load during peak hours or a greater load in particular venues, such railway stations, etc. The time and spatial correlation may be used by the base station to predict RACH resource use and to reduce RACH resource use for MPE measurements during times having an increased RACH load and/or in locations having an increase RACH load. Similarly, the base station may use a prediction of RACH resource loads in time and physical location to allow an increased amount of MPE measurement using RACH resources during times predicted to have a lower RACH load and/or in locations predicted to have a lower RACH load.

In a second example of potential interference, an MPE measurement from a first UE may interfere with RACH detection of another UE. The power spectral density of the UE performing MPE measurement may be limited to address this potential interference problem. For example, a cell-edge UE having approximately 140 dB path loss may need to perform RACH in the system. A −6 dB SNR may be needed to detect the signal, and the UE may transmit over 1 RB of bandwidth (~1.44 MHz at 120 KHz SCS). With a 5 dB base station Noise Figure (NF), the noise power in that BW may be −107 dBm. Therefore, the sensitivity for detecting the RACH may be around −113 dBm. If a target rise-over-thermal noise allowed by a single UE measuring MPE, as seen at the base station, is set at −20 dB and that UE has a path loss of 60 dB to the base station over an approximate distance of 1 m), then, the power spectral density of the UE performing MPE measurement may be limited to −67 dBm over 1.44 MHz. This limit might be prohibitively low to make the MPE measurement. Therefore, similar to the first example of potential interference, a network may manage or control resource use for MPE measurement.

However, if the UE is just 10 m away from the base station, then the power of the UE performing MPE measurement can be increased by 20 dB to create the same level of interference as the UE that is only 1 m away from the base station. At −47 dBm per 1.44 MHz, the MPE measurement becomes much more practical, and the resources may be used without an explicit network indication. Thus, the UE may use the available resources without network management or control, e.g., as an interferer below 20 dB will cause negligible degradation to RACH performance of the other UE.

With multiple UEs performing MPE measurement simultaneously, e.g., with 10 UEs performing simultaneous MPE measurement each from a 10 m distance, the total interference power affecting the RACH is still 10 dB below the noise limit. Each user may make a full MPE measurement over a single RACH resource and may not need to take another measurement for approximately 100 ms. Additionally, a RACH resource may occur every 20 ms. Thus, the available RACH resources may provide capacity for 50 UEs at a 10 m distance to perform MPE measurements without disrupting RACH performance. UEs will likely be distributed in various points in the cell. This distribution may enable UEs at an additional distance to perform additional MPE measurements without disrupting RACH performance. This may be desirable, as UEs that are farther from the base station are more likely to violate an MPE limit.

In certain aspects, a UE may use a knowledge of the base station's listening direction in order to perform MPE measurements on antenna sub-arrays corresponding to a poor listening direction for the base station. Thus, the UE may select antenna sub-arrays of a particular antenna module having a reduced quality as a listening direction for the base station to use in making MPE measurements. For example, RACH resources may be divided into intervals having a correspondence with SS blocks. This may allow the UE to determine a quality of the listening direction. A UE needing to measure MPE may be, e.g., in a connected state with beam measurements being available. Thus, the UE may be able to schedule its MPE measurement to match antenna sub-arrays for which the RACH listening direction at the base station is poor.

In a third example of potential interference, multiple UEs, each measuring MPE, may cause interference among each other's MPE measurements. Power level limits may be used to limit interference among MPE measurements. Additionally, randomized times for MPE measurement and randomized use of antenna sub-arrays to make MPE measurements may reduce the severity of this problem. If this type of interference is a problem, a base station may coordinate MPE measurement in a controlled mode. For example, the base station may coordinate the number of UEs performing MPE measurement in a given resource. Additionally, the base station may group sets of UEs into groups having disparate pathloss, e.g., wherein the UEs within a grouped set have different levels of pathloss, and enable the group of UEs to perform MPE measurement in a particular resource in order to reduce a level of interference to the MPE measurement of each UE.

When the MPE measurement indicates an exposure condition, the UE may take any of a number of actions in order to comply with MPE limits. For example, the UE may reduce a transmission power. The UE may switch transmission to a different antenna array, e.g., to an antenna array that is unobstructed by the person's body. This may change the transmission direction. The UE may operate to increase a transmission power when the MPE measurements indicate that an antenna array is unobstructed by a person's body. Similarly, the UE may reduce the transmission power upon detection of an obstruction based on the MPE measurement.

Figure 8:
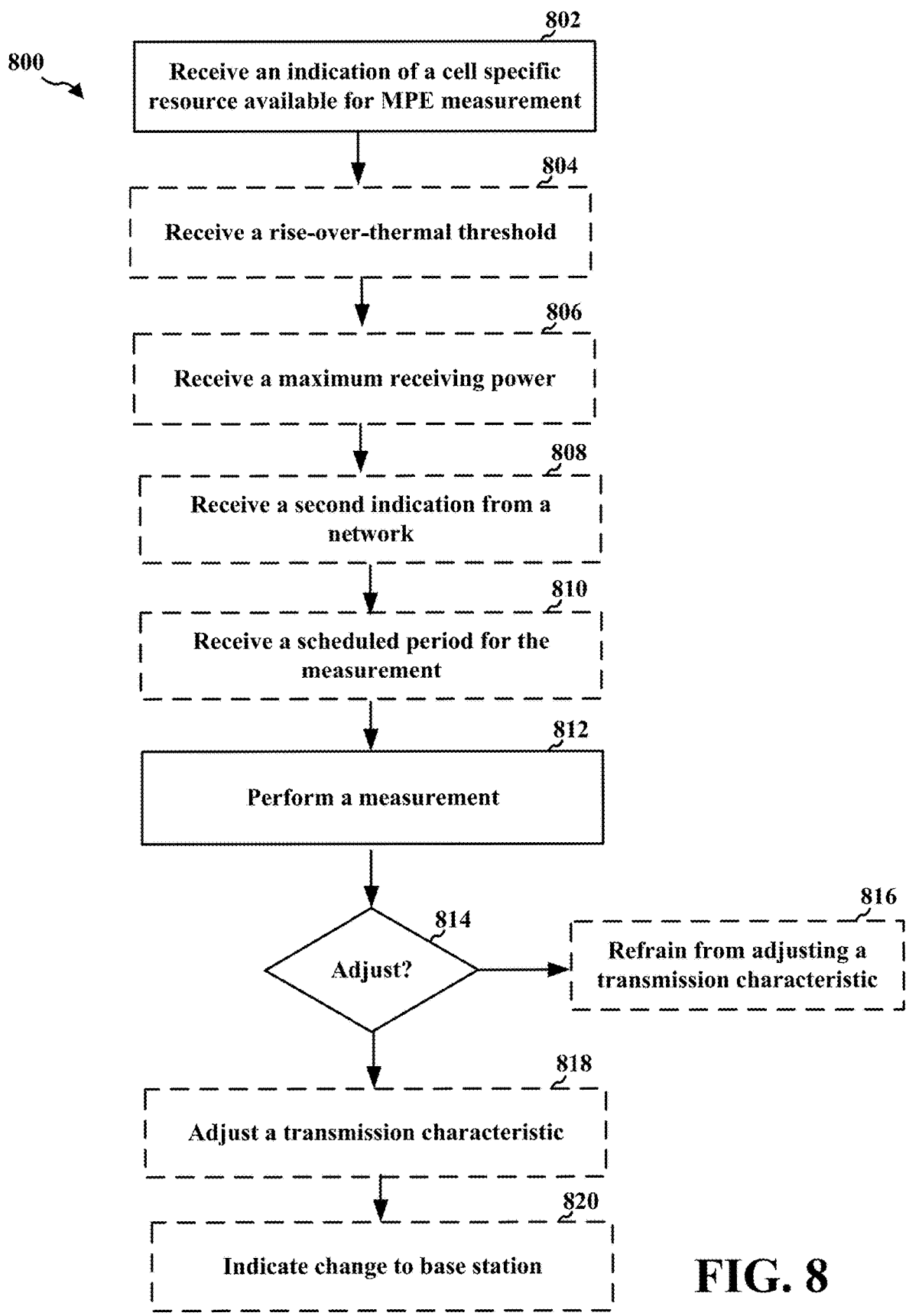
FIG. 8 is a flowchart of a method of wireless communication.

FIG. 8 is a flowchart 800 of a method of wireless communication. The method may be performed by a UE (e.g., the UE 104, 350, 404, 708, 1250, the apparatus 902, 902'). Optional aspects are illustrated using a dashed line. At 802, the UE receives, from a base station, an indication of a cell specific resource. For example, the indication may indication cell specific resources available for an exposure measurement, e.g., MPE measurement. The cell specific resource may be contained within a system gap, e.g., a system wide gap configured for the measurement. The cell specific resource may comprises an uplink cell specific resource. The cell specific resource may include a guard resource between a RACH resource and a data or control resource or a guard resource between two RACH resources in the frequency domain. The cell specific resource may comprise at least one of a RACH resource, a beam failure recovery resource, or an SR resource. The cell specific resource may comprise an existing resource opportunity, e.g., an unscheduled uplink resource and/or a gap between a downlink transmission and an uplink transmission. The cell specific resource may comprise a downlink resource. The cell specific resource may comprise at least one SS resource, e.g., the UE may perform the measurement based on an SS block for which the UE did not detect a signal, e.g., when the UE detects a low RSRP. Thus, the UE may perform the measurement during the transmission of an SS block that the UE did not detect.

At 812, the UE performs a measurement based on the cell specific resource. The UE may determine a transmission power for performing the measurement based on downlink path loss values. For example, the UE may autonomously determine the transmission power for the measurement based on downlink path loss, or may determine the transmission power for the measurement further based on an indication from the base station.

In one example, the UE may perform the measurement based on scheduling configuration, where the UE performs the measurement based on a resource for which the base station has not scheduled the UE. Thus, the UE may receive a control channel and determine an unscheduled resource to use for performing the MPE measurement.

In an example in which the cell specific resource comprises a RACH resource, the UE may schedule at least one sub-array for performing the measurement based on a RACH resource listening direction. The UE may further determine whether to perform the measurement in a particular RACH resource based on an interference power received in a prior RACH resource. This may enable the UE to assess the system load for the RACH resource, e.g., based on the detected interference power during the prior RACH resource.

The RACH resource may comprise multiple sub-resources, each sub-resource corresponding to a different SS block within an SS burst set. The duration of the RACH resource may comprise at least a subset of symbols within a slot. For example, the RACH resource available for MPE measurement may comprise a single slot. In another example, the RACH resource may comprise multiple slots. In yet another example, the RACH resource may comprise a subset of symbols within a slot. The UE may select an SS block and perform the measurement at 812 based on a corresponding RACH sub-resource for the selected SS block. For example, the UE may select an SS block based on signal strength, e.g., an SS block having a reduced signal strength. If the UE detects a low signal strength, e.g., RSRP, for an SS block, the low signal strength may indicate the base station is transmitting in a different direction at that time. By selecting an SS block having a reduced signal strength for performing the MPE measurement, the UE reduces the potential interference caused by the MPE measurement and the potential for inaccuracies in the MPE measurement. Similarly, during RACH resource within a slot, the base station may also listen to different directions. It may be beneficial for the UE to perform MPE measurement during these times, because the UE will be less likely to interfere with another UE's signal.

The network may control use of the resource for MPE measurement. For example, the UE may receive a second indication from the network at 808 regarding use of the cell specific resource for MPE measurement. In one example, the UE may receive a second indication from a network that the cell-specific resource may be used for the measurement. The UE may be configured to refrain from using the resource for MPE measurement, unless the UE receives the indication that the resource may be used for MPE measurement. In another example, the UE may receive a second indication from the network that the cell specific resource may not be used for the measurement, which may cause the UE to refrain from using the resource for MPE measurement. For example, the UE may be free to use the resource for MPE measurement, unless an indication is received from the base station letting the UE know that the resource may not be used for MPE measurement.

The indication may indicate the ability to use the cell specific resource for the measurement and may comprise any of a parameter in a MIB, a SIB, other system information, a Medium Access Control (MAC) Control Element (CE), Downlink Control Information (DCI), a Radio Resource Control (RRC) message, or in a message from another carrier (e.g., LTE carrier or 5G sub-6 carrier). The indication may place a limit, or otherwise throttle or reduce, the use of the cell specific resource for the measurement. The indication regarding use of the cell specific resource may also be indicated in a second indication at 808, separate from the indication of the cell specific resource at 802.

At 810, the UE may receive a scheduled period for the measurement from the base station. Thus, the scheduled period for a UE to perform MPE measurement may be explicitly controlled by the base station. In another example, the period for MPE measurement may be statistically controlled, e.g., the base station may indicate to the UE that it may transmit MPE signals a number N times in a duration of T seconds. The base station may indicate to the UE that during a number C of cell specific resources or during a number S of system wide gaps, the UE may randomly select resources within the cell specific resources/system wide gap for the transmission of the MPE signal.

The UE may receive additional information from the base station that controls the MPE measurement. For example, at 804, the UE may receive a rise-over-thermal threshold for the measurement from a base station. The UE may then use the indicated rise-over-thermal threshold when performing the MPE measurement. At 806, the UE may receive a maximum receiving power at which a transmission for the measurement may be received at a base station. The UE may use the received maximum receiving power to determine a transmission power for the MPE measurement performed at 812.

In another example, the UE may perform the measurement during the cell specific resource based on an uplink grant from the base station, e.g., gNB. For example, the UE may perform the measurement when the base station has not scheduled any uplink data to the UE in a same resource, e.g., slot. For example, when a minimum gap of N slots may be provided between PDCCH containing an UL grant and the corresponding PUSCH. In one example, the base station may schedule PUSCH in frequency division multiplexed regions of the cell specific uplink resource (e.g. RACH). In another example, the base station may schedule PUSCH in the same time-frequency regions of cell specific uplink resource (e.g. RACH) by using multiple reception panels/subarrays. For example, one panel may receive RACH while the panel receives PUSCH in the same time-frequency resources. If the cell specific uplink resource (e.g. RACH resource) occurs in slot X, the UE may monitor PDCCH until slot X-N to check whether the UE has been scheduled any uplink data/control in slot X. If the UE has been scheduled uplink data/control in slot X, UE may refrain from performing any MPE measurement in slot X and may instead transmit the uplink data/control. If the UE has not been scheduled uplink data/control in slot X, the UE may perform MPE measurement in slot X.

At 814, the UE determines whether to adjust a transmission characteristic of the user equipment based on whether the result of the measurement performed at 812 meets a threshold. The transmission characteristic may comprise any combination of a transmission power, a transmission direction, an antenna sub-array selection, or an antenna module selection For example, when an MPE measurement meets the threshold, the measurement may indicate an obstruction on the antenna element by a person's body. In response to detecting such an obstruction, at 818, the UE adjusts a transmission characteristic of the user equipment when the measurement meets the threshold. The UE may reduce a transmission power and/or switch antenna elements for transmission in order to comply with MPE limits. In another example, the threshold may indicate that there is no potential problematic exposure condition for a person. In this example, the UE may adjust the transmission characteristic at 818 by increasing the transmission power and/or switching to a more preferred antenna element. When a transmission characteristic is changed at the UE at 818, the UE may indicate to the base station the adjustment of the transmission characteristic at 820. In contrast, when the threshold is not met at 914, the UE may refrain from adjusting a transmission characteristic at 816.

Figure 9:
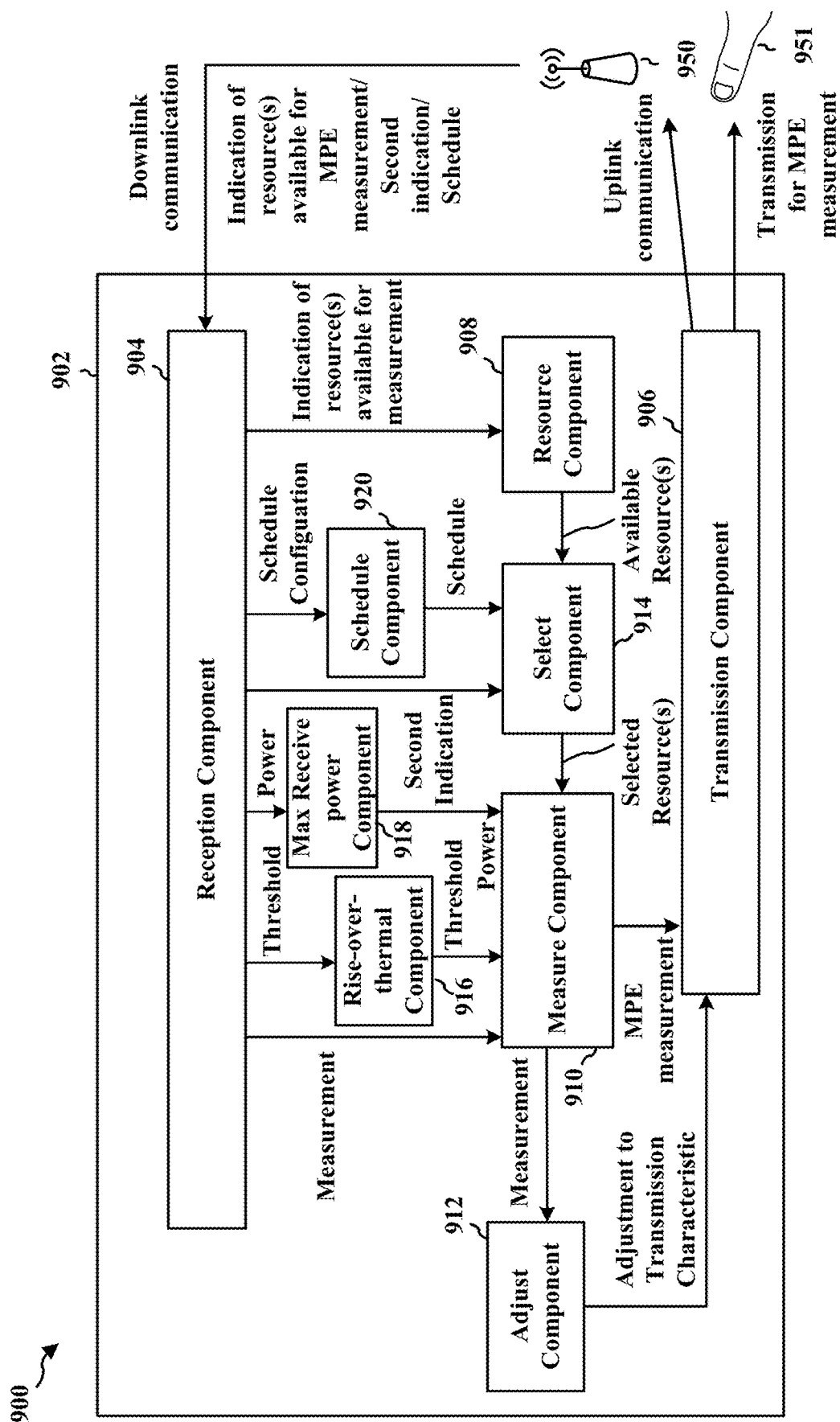
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE (e.g., the UE 104, 350, 404, 708, 1250) communicating with a base station 950 (e.g., base station 102, 180, 310, 402, 502, the apparatus 1202, 1202'). The apparatus includes a reception component 904 that receives downlink communication from base station 950 and that receives a signal based on a MPE transmission as part of an exposure measurement. The apparatus includes a transmission component 906 that transmits uplink communication to base station 950 and that transmits a transmission as part of an MPE measurement to detect an exposure condition regarding a portion of a person's body 951 being exposed to RF energy from the transmission component 906. The apparatus includes a resource component 908 configure to receive an indication of a cell specific resource available for MPE measurement. The apparatus includes a measure component 910 configured to perform a measurement based on the cell specific resource, e.g., by transmitting a transmission via the transmission component 906 and using reception component 904 to measure and detect when a portion of a person's body 951 is in the direction of a transmitting antenna element. The apparatus includes an adjust component 912 that determines whether to adjust a transmission characteristic, e.g., of transmission component 906, based on whether the measurement meets a threshold. The adjust component 906 may adjust any of a transmission power, a transmission direction, an antenna sub-array selection, or an antenna module selection based on the result of the MPE measurement. When the threshold is met, the adjust component 906 may adjust the transmission characteristic and may send an indication to the base station 950 regarding the adjustment.

The apparatus may include a rise-over-thermal component 916 that receives an indication of a rise-over-thermal threshold and that provides the threshold to the measure component 910 for use in performing the MPE measurement. The apparatus may include a maximum receive power component 918 configured to receive a maximum receiving power at which a transmission for the measurement may be received at a base station. The maximum receive power component 918 may provide the maximum receiving power indication to the measure component 910 for use in performing the MPE measurement.

The apparatus may comprise a select component 914 configured to select a resource, from the resources available for MPE measurement, for performing the MPE measurement. For example, the select component 914 may receive the indication regarding the resources available for MPE measurement from resource component 908. The select component 914 may autonomously select a resource, e.g., which may be based on measurements made by the UE.

Alternately, the select component may receive additional indications from the base station 950 that manage or otherwise control the use of the resources available for MPE measurement. The apparatus may include components that receive additional indications from base station 950 that control the use of resources for MPE measurement. For example, the select component may receive a second indication indicating that the apparatus may use a cell specific resource for MPE measurement, or the select component may receive a second indication indicating that the apparatus may not use a cell specific resource for MPE measurement. The apparatus may include a schedule component 920 that receives a schedule configuration for the UE. The select component 914 may use the schedule configuration to select an unscheduled resource for performing the MPE measurement. The schedule component may receive a scheduled period for the MPE measurement and may provide the scheduled period to the select component 914.

The apparatus may include additional components that perform each of the blocks of the algorithm in the aforementioned flowchart of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
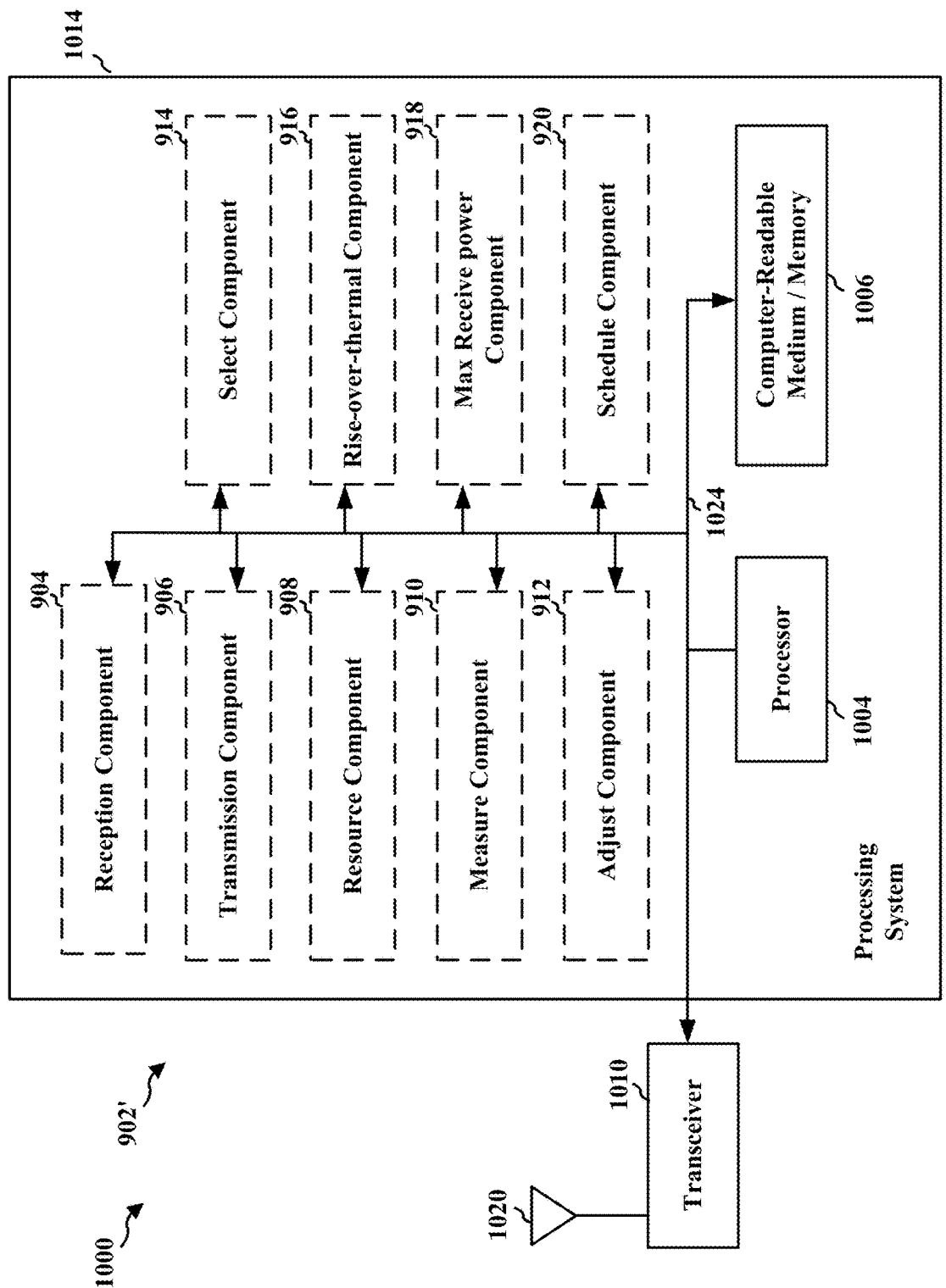
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, 918, 920, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916, 918, 920. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for receiving an indication of a comprising a cell specific resource available for MPE measurement, means for performing a measurement based on the cell specific resource, means for determining whether to adjust a transmission characteristic of the user equipment based on whether the measurement meets a threshold, means for receiving an indication from a network that the cell-specific resource may be used for the measurement, means for receiving an indication that the cell specific resource may not be used for the measurement, means for receiving an indication regarding use of an uplink resource for the measurement, means for receiving a rise-over-thermal threshold for the measurement from a base station, means for receiving a maximum receiving power at which an MPE use may be received at a base station, means for receiving a scheduled period for the measurement from a base station, means for adjusting a transmission characteristic of the user equipment when the measurement meets the threshold, and means for indicating an adjustment of the transmission characteristic to a base station. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
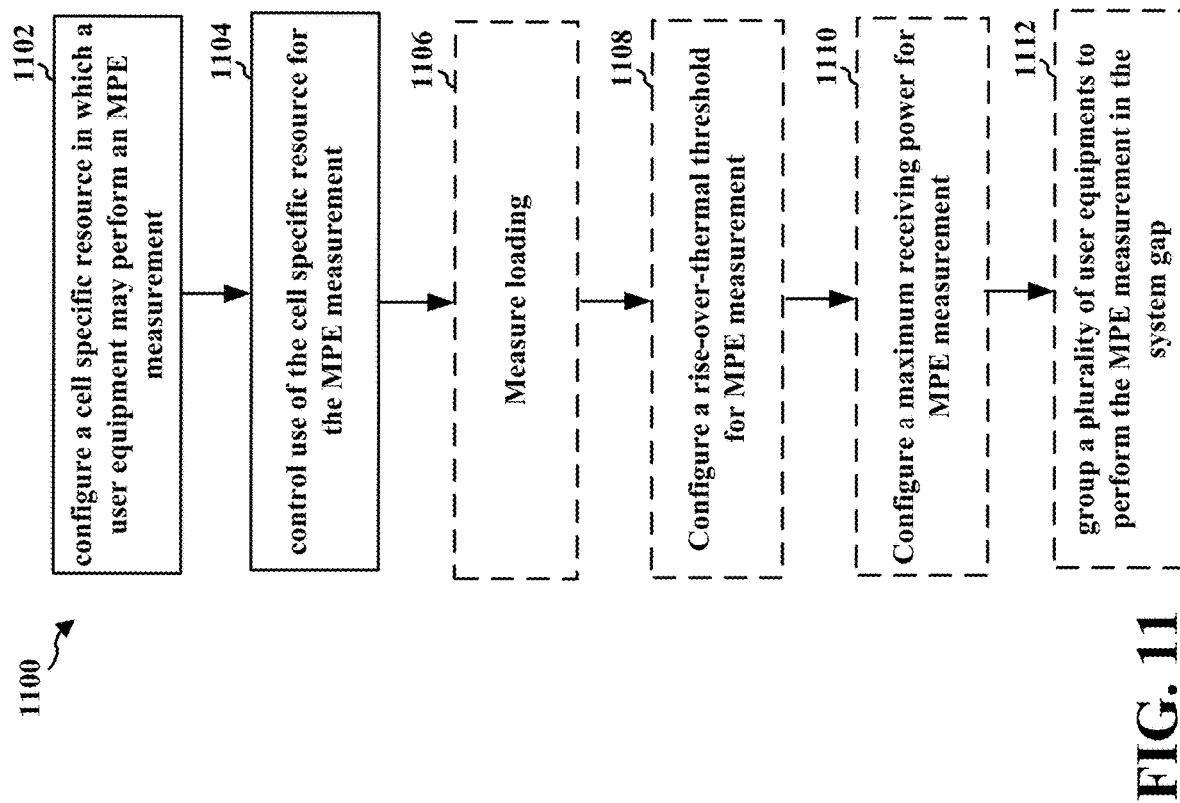
FIG. 11 is a flowchart of a method of wireless communication.

FIG. 11 is a flowchart 1100 of a method of wireless communication. The method may be performed by a base station (e.g., base station 102, 180, 310, 402, 502, 950, the apparatus 1202, 1202'). At 1102, the base station configures a cell specific resource in which a user equipment may perform an MPE measurement, e.g., an MPE measurement as described in connection with FIGS. 5-7. The cell specific resource may comprise at least one of a RACH resource, a beam failure recovery resource, and/or a scheduling request resource. In another example, the cell specific resource may comprise a downlink resource.

At 1104, the base station controls use of the cell specific resource for the MPE measurement. For example, the base station may transmit an indication that an uplink resource may be used for the MPE measurement. Thus, the UE may wait to receive an indication that the resource may be used for MPE measurement before performing measurements based on the resource. As another example, the base station may transmit an indication that an uplink resource may not be used for the MPE measurement. Thus, the UE may choose whether or not to use the resource for MPE measurement, unless the base station indicates that the resource may not be used. The base station may set a parameter that governs when an uplink resource may be used for the MPE measurement. The base station may transmit an indication regarding use of an uplink resource for the MPE measurement, wherein the indication comprises a parameter in at least one of a MIB, SIB, other system information, a MAC CE, DCI, or RRC message. The indication may throttle or otherwise place a limit on a UE's use of the uplink resource for the MPE measurement. The base station may transmit a scheduled period for the MPE measurement to a user equipment. The scheduled period for the MPE measurement may be based on a pending uplink data transmission for the user equipment.

The cell specific resource may comprises a RACH resource. In this example, the base station may measure loading during the cell specific resource at 1106, e.g., the RACH loading. Then, the base station may transmit an indication that identifies limits on the use of the RACH resource for the MPE measurement based on the RACH loading measured at 1106.

The base station may configure a rise-over-thermal threshold for the MPE measurement to the UE at 1108 that the base station may indicate to the UE, e.g., in a transmission. The base station may configure, at 1110, a maximum receiving power at which a transmission from the UE for MPE measurement may be received at the base. The base station may indicate the maximum receiving power to the UE, e.g., in a transmission.

The base station may group, at 1112, a plurality of UEs to perform the MPE measurement in the system gap. The grouping may be based on the plurality of UEs having disparate pathloss.

Figure 12:
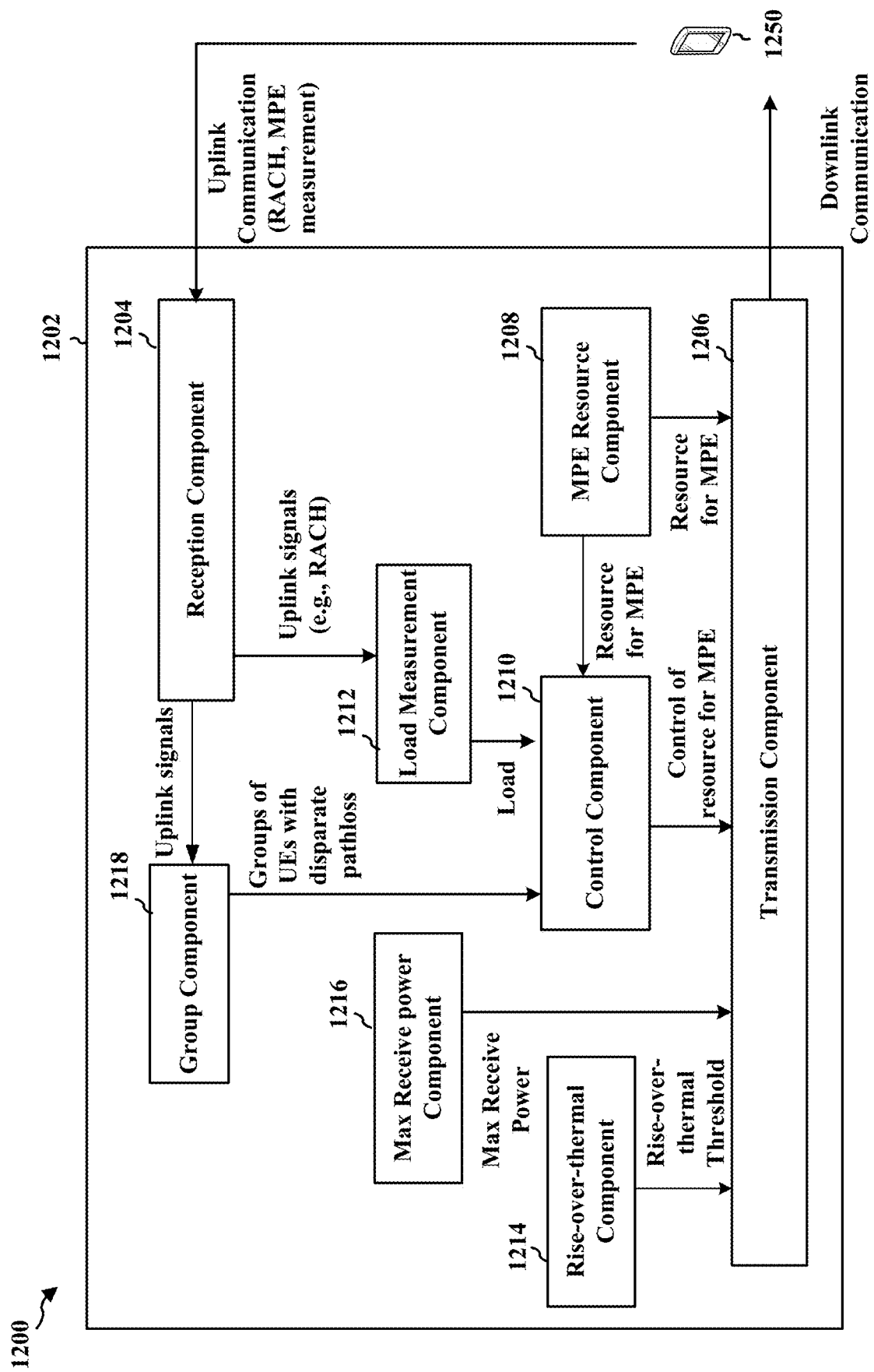
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station (e.g., base station 102, 180, 310, 402, 502) communication with a UE (e.g., the UE 104, 350, 404, 708, 1250, the apparatus 902, 902'). The apparatus includes a reception component 1204 that receives uplink communication from UE 1250, including RACH and transmissions made by the UE for MPE measurement. The apparatus includes a transmission component 1206 that transmits downlink communication to the UE 1250. The apparatus may comprise an MPE resource component 1208 that configures a cell specific resource in which a user equipment may perform a MPE measurement. The apparatus may also include a control component 1210 configured to control use of the cell specific resource for the MPE measurement, e.g., as described in connection with FIGS. 8 and 11.

The apparatus may include a load measurement component 1212 configured to measure a load on a cell specific resource for MPE measurement. For example, the load measurement component 1212 may measure a RACH loading, and the control component 1210 may limit, or otherwise control, use of the cell specific resource for MPE measurement based on the measured load for the resource.

The apparatus may include a rise-over-thermal component 1214 that may transmit a rise-over-thermal threshold for the MPE measurement to the UE 1250 via transmission component 1206. The apparatus may include a max receive power component 1216 that transmits a maximum receiving power to UE 1250 via the transmission component 1206, the max receiving power being a maximum at which a transmission from the UE 1250 for MPE measurement may be received at the base station.

The apparatus may include group component 1218 configured to group a plurality of UEs to perform the MPE measurement. The grouping may be based on the plurality of user equipment having disparate pathloss and may be provided to the control component 1210 for control/management of the resource for MPE measurement.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
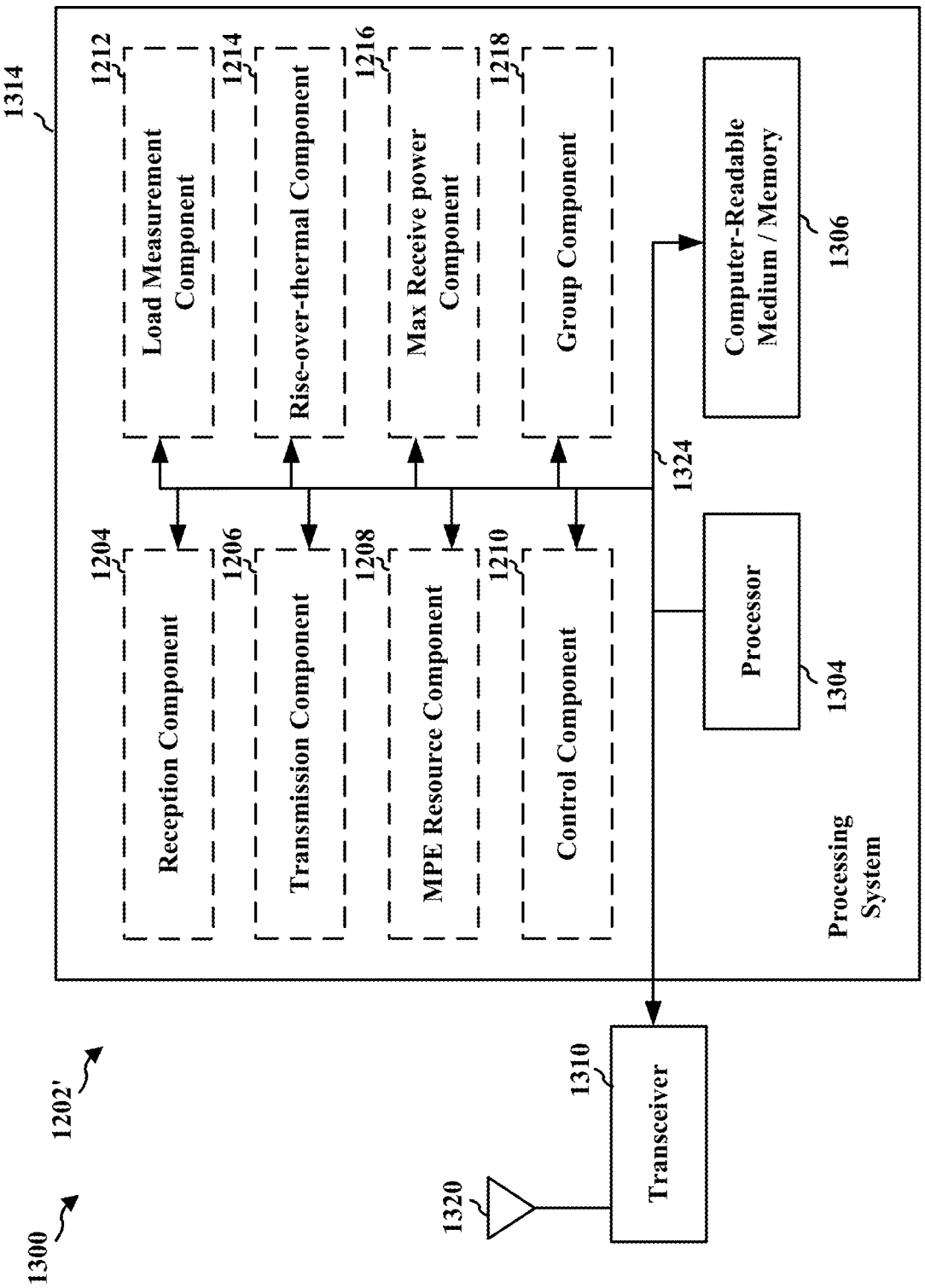
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375

In one configuration, the apparatus 1202/1202' for wireless communication includes means for configuring a cell specific resource in which a user equipment may perform an MPE measurement, means for controlling use of the cell specific resource for the MPE measurement, means for transmitting an indication that an uplink resource may be used for the MPE measurement, means for transmitting an indication that an uplink resource may not be used for the MPE measurement, means for setting a parameter that governs when an uplink resource may be used for the MPE measurement, means for transmitting an indication regarding use of an uplink resource for the MPE measurement, means for measuring a RACH loading, means for transmitting a rise-over-thermal threshold for the MPE measurement, means for transmitting a maximum receiving power at which an MPE use may be received at the base station, means for transmitting a scheduled period for the MPE measurement to a user equipment, and means for grouping a plurality of UEs to perform the MPE measurement in the system gap. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving an indication of a first transmission limitation applicable in a first frequency spectrum that is different from a second frequency spectrum in which a second transmission limitation is applicable, each of the first and second transmission limitations being associated with a respective maximum permissible exposure (MPE) measurement that is at least in part representative of radio frequency (RF) exposure caused by the UE;
   performing the respective MPE measurement; and
   applying the first transmission limitation for a transmission based on the respective MPE measurement.

2. The method of claim 1, further comprising:
   receiving an indication of a cell specific resource available for use for the respective MPE measurement, wherein the respective MPE measurement is performed based on the cell specific resource.

3. The method of claim 2, wherein the cell specific resource comprises at least one of a cell specific resource that is at least partially contained within a system gap or an uplink cell specific resource.

4. The method of claim 2, wherein the cell specific resource comprises a time resource for at least one of a Random Access Channel (RACH) resource, a beam failure recovery resource, or a scheduling request (SR) resource.

5. The method of claim 4, wherein the UE determines a transmission power for the measurement based on downlink path loss values.

6. The method of claim 4, wherein the UE schedules at least one sub-array for performing the measurement based on RACH resource listening directions.

7. The method of claim 4, wherein the UE determines whether to perform the measurement based on an interference power received in a prior RACH resource.

8. The method of claim 4, wherein the cell specific resource comprises the RACH resource, wherein the RACH resource comprises multiple sub-resources, each sub-resource corresponding to a different synchronization signal (SS) block within an SS burst set.

9. The method of claim 8, wherein a duration of the RACH resource comprises at least a subset of symbols within a slot.

10. The method of claim 8, wherein the UE selects an SS block and performs the measurement based on a corresponding RACH sub-resource for the selected SS block.

11. The method of claim 10, where the UE selects an SS block having a reduced signal strength.

12. The method of claim 2, further comprising:
    receiving a second indication from a network that the cell specific resource is permitted to be used for the measurement.

13. The method of claim 2, further comprising:
    receiving a second indication from a network that the cell specific resource is restricted from use for the measurement.

14. The method of claim 2, wherein the indication of the cell specific resource indicates an ability to use the cell specific resource for the measurement, wherein the indication of the cell specific resource comprises a parameter in at least one of a Master Information Block (MIB), other system information, Medium Access Control (MAC) Control Element (CE), Downlink Control Information (DCI), a Radio Resource Control (RRC) message, or in a message from a different carrier wherein the indication of the cell specific resource places a limit on the use of the cell specific resource for the measurement.

15. The method of claim 14, where the different carrier comprises a Long Term Evolution (LTE) carrier or a 5G sub-6 carrier.

16. The method of claim 2, further comprising:
receiving a rise-over-thermal threshold for the measurement from a base station.

17. The method of claim 2, wherein the cell specific resource comprises an existing resource opportunity, the existing resource opportunity comprising at least one of an unscheduled uplink resource and a gap between a downlink transmission and an uplink transmission.

18. The method of claim 2, wherein the cell specific resource includes a guard tone between a Random Access Channel (RACH) resource and a data resource or control resource or between two RACH resources in a frequency domain.

19. The method of claim 2, wherein the cell specific resource comprises a downlink resource.

20. The method of claim 19, wherein the cell specific resource comprises at least one synchronization signal (SS) resource.

21. The method of claim 20, wherein the UE performs the measurement based on an SS block for which the user equipment did not detect a signal.

22. The method of claim 2, wherein the UE performs the measurement during the cell specific resource based on an uplink grant from a base station.

23. The method of claim 22, wherein the UE performs the measurement when the base station has not scheduled any uplink data to the UE in a same resource.

24. The method of claim 2, wherein the cell specific resource corresponds to a resource that is commonly available to multiple UEs served by a cell to use for the measurement.

25. The method of claim 1, further comprising:
receiving a maximum receiving power at which a transmission for the measurement is to be received at a base station.

26. The method of claim 1, further comprising:
receiving a scheduled period for the measurement from a base station.

27. The method of claim 1, wherein applying the first transmission limitation for the transmission based on the respective MPE measurement comprises:
adjusting a transmission characteristic of the UE based on the respective MPE measurement and based on a cell-specific MPE threshold included in the indication of the first transmission limitation.

28. The method of claim 27, wherein the transmission characteristic comprises at least one of a transmission power, a transmission direction, an antenna array selection, an antenna module selection, or a transmission schedule.

29. The method of claim 28, further comprising:
indicating an adjustment of the transmission characteristic to a base station, wherein the indication of the first transmission limitation is received from the base station.

30. An apparatus for wireless communication at a user equipment (UE), comprising:
a memory; and
at least one processor coupled to the memory and configured to:
receive an indication of a first transmission limitation applicable in a first frequency spectrum that is different from a second frequency spectrum in which a second transmission limitation is applicable, each of the first and second transmission limitations being associated with a respective maximum permissible exposure (MPE) measurement that is at least in part representative of radio frequency (RF) exposure caused by the UE;
perform the respective MPE measurement; and
apply the first transmission limitation for a transmission based on the respective MPE measurement.

31. The apparatus of claim 30, further comprising:
receiving an indication of a cell specific resource available for use for the respective MPE measurement, wherein the respective MPE measurement is performed based on the cell specific resource.

32. The apparatus of claim 31, wherein the cell specific resource comprises at least one of a cell specific resource that is at least partially contained within a system gap or an uplink cell specific resource.

33. The apparatus of claim 31, wherein the cell specific resource comprises a time resource for at least one of a Random Access Channel (RACH) resource, a beam failure recovery resource, or a scheduling request (SR) resource.

34. The apparatus of claim 33, wherein the UE determines a transmission power for the measurement based on downlink path loss values.

35. The apparatus of claim 33, wherein the UE schedules at least one sub-array for performing the measurement based on RACH resource listening directions.

36. The apparatus of claim 33, wherein the UE determines whether to perform the measurement based on an interference power received in a prior RACH resource.

37. The apparatus of claim 33, wherein the cell specific resource comprises the RACH resource, wherein the RACH resource comprises multiple sub-resources, each sub-resource corresponding to a different synchronization signal (SS) block within an SS burst set.

38. The apparatus of claim 37, wherein a duration of the RACH resource comprises at least a subset of symbols within a slot.

39. The apparatus of claim 37, wherein the UE selects an SS block and performs the measurement based on a corresponding RACH sub-resource for the selected SS block.

40. The apparatus of claim 39, where the UE selects an SS block having a reduced signal strength.

41. The apparatus of claim 31, wherein the at least one processor is further configured to:
receive a second indication from a network that the cell specific resource is permitted to be used for the respective MPE measurement.

42. The apparatus of claim 31, wherein the at least one processor is further configured to:
receive a second indication from a network that another cell specific resource is restricted from use for the respective MPE measurement.

43. The apparatus of claim 31, wherein the indication of the cell specific resource indicates an ability to use the cell specific resource for the measurement, wherein the indication of the cell specific resource comprises a parameter in at least one of a Master Information Block (MIB), other system information, Medium Access Control (MAC) Control Element (CE), Downlink Control Information (DCI), a Radio Resource Control (RRC) message, or in a message from a different carrier wherein the indication of the cell specific resource places a limit on the use of the cell specific resource for the measurement.

44. The apparatus of claim 43, where the different carrier comprises a Long Term Evolution (LTE) carrier or a 5G sub-6 carrier.

45. The apparatus of claim 31, wherein the cell specific resource comprises an existing resource opportunity, the existing resource opportunity comprising at least one of an unscheduled uplink resource and a gap between a downlink transmission and an uplink transmission.

46. The apparatus of claim 31, wherein the cell specific resource includes a guard tone between a Random Access Channel (RACH) resource and a data resource or control resource or between two RACH resources in a frequency domain.

47. The apparatus of claim 31, wherein the cell specific resource comprises a downlink resource.

48. The apparatus of claim 31, wherein the cell specific resource comprises at least one synchronization signal (SS) resource.

49. The apparatus of claim 48, wherein the UE performs the measurement based on an SS block for which the user equipment did not detect a signal.

50. The apparatus of claim 31, wherein the UE performs the measurement during the cell specific resource based on an uplink grant from a base station.

51. The apparatus of claim 50, wherein the UE performs the measurement when the base station has not scheduled any uplink data to the UE in a same resource.

52. The apparatus of claim 30, wherein the at least one processor is further configured to:
receive a rise-over-thermal threshold for the measurement from a base station.

53. The apparatus of claim 30, wherein the at least one processor is further configured to:
receive a maximum receiving power at which a transmission for the measurement is to be received at a base station.

54. The apparatus of claim 30, wherein the at least one processor is further configured to:
receive a scheduled period for the measurement from a base station.

55. The apparatus of claim 30, wherein the application of the first transmission limitation for the transmission based on the respective MPE measurement comprises:
adjust a transmission characteristic of the UE based on the respective MPE measurement and based on a cell-specific MPE threshold included in the indication of the first transmission limitation.

56. The apparatus of claim 55, wherein the transmission characteristic comprises at least one of a transmission power, a transmission direction, an antenna array selection, an antenna module selection, or a transmission schedule.

57. The apparatus of claim 56, wherein the at least one processor is further configured to:
indicate an adjustment of the transmission characteristic to a base station, wherein the indication of the first transmission limitation is received from the base station.

58. An apparatus for wireless communication at a user equipment (UE), comprising:
means for receiving an indication of a first transmission limitation applicable in a first frequency spectrum that is different from a second frequency spectrum in which a second transmission limitation is applicable, each of the first and second transmission limitations being associated with a respective maximum permissible exposure (MPE) measurement that is at least in part representative of radio frequency (RF) exposure caused by the UE;
means for performing the respective MPE measurement; and means for applying the first transmission limitation for a transmission based on the respective MPE measurement.

59. The apparatus of claim 58, further comprising:
means for receiving a second indication from a network that comprises a cell specific resource available to be used for the respective MPE measurement, wherein the respective MPE measurement is performed based on the cell specific resource.

60. The apparatus of claim 59, further comprising:
means for receiving a third indication from the network that another cell specific resource is restricted from use for the respective MPE measurement.

61. The apparatus of claim 58, further comprising:
means for receiving a rise-over-thermal threshold associated with the respective MPE measurement from a base station.

62. The apparatus of claim 58, further comprising:
means for receiving a maximum receiving power at which a transmission for the measurement is to be received at a base station.

63. The apparatus of claim 58, further comprising:
means for receiving a scheduled period for the measurement from a base station.

64. The apparatus of claim 58, wherein means for applying the first transmission limitation for the transmission based on the respective MPE measurement is configured to:
adjust a transmission characteristic of the UE based on the respective MPE measurement and based on a cell-specific MPE threshold included in the indication of the first transmission limitation.

65. The apparatus of claim 64, wherein the transmission characteristic comprises at least one of a transmission power, a transmission direction, an antenna array selection, an antenna module selection, or a transmission schedule, the apparatus further comprising:
means for indicating an adjustment of the transmission characteristic to a base station, wherein the indication of the first transmission limitation is received from the base station.

66. A non-transitory computer-readable medium storing computer executable code for wireless communication at a user equipment (UE), comprising code to:
receive an indication of a first transmission limitation applicable in a first frequency spectrum that is different from a second frequency spectrum in which a second transmission limitation is applicable, each of the first and second transmission limitations being associated with a respective maximum permissible exposure (MPE) measurement that is at least in part representative of radio frequency (RF) exposure caused by the UE;
perform the respective MPE measurement; and
apply the first transmission limitation for a transmission based on the respective MPE measurement.

67. The non-transitory computer-readable medium of claim 66, further comprising code to:
receive a second indication from a network that comprises a cell specific resource available to be used for the respective MPE measurement, wherein the respective MPE measurement is performed based on the cell specific resource.

68. The non-transitory computer-readable medium of claim 66, further comprising code to:
receive a second indication from a network that another cell specific resource is restricted from use for the respective MPE measurement.

69. The non-transitory computer-readable medium of claim 66, further comprising code to:
receive a rise-over-thermal threshold for the measurement from a base station.

70. The non-transitory computer-readable medium of claim 66, further comprising code to:
receive a maximum receiving power at which a transmission for the measurement is to be received at a base station.

71. The non-transitory computer-readable medium of claim 66, further comprising code to:
receive a scheduled period for the measurement from a base station.

72. The non-transitory computer-readable medium of claim 66, wherein the code to apply the first transmission limitation for the transmission comprises code to:
adjust a transmission characteristic of the UE based on the respective MPE measurement and based on a cell-specific MPE threshold included in the indication of the first transmission limitation.

73. The non-transitory computer-readable medium of claim 72, wherein the transmission characteristic comprises at least one of a transmission power, a transmission direction, an antenna array selection, an antenna module selection, or a transmission schedule, further comprising code to:
indicate an adjustment of the transmission characteristic to a base station, wherein the indication of the first transmission limitation is received from the base station.

74. A method of wireless communication at a base station, comprising:
configuring a first transmission limitation applicable in a first frequency spectrum that is different from a second frequency spectrum in which a second transmission limitation is applicable, each of the first and second transmission limitations being associated with a respective maximum permissible exposure (MPE) measurement that is at least in part representative of radio frequency (RF) exposure caused by a user equipment (UE); and
transmitting an indication of the first transmission limitation to the UE for application with a transmission that is associated with the respective MPE measurement.

75. The method of claim 74, further comprising:
transmitting, to the UE, an indication of a cell specific resource configured to be available for use for the respective MPE measurement, wherein the cell specific resource comprises a time resource for at least one of a Random Access Channel (RACH) resource, a beam failure recovery resource, or a scheduling request resource.

76. The method of claim 75, further comprising:
controlling UEs operating on a cell to which the cell specific resource is specific based on the first transmission limitation and the cell specific resource.

77. The method of claim 76, wherein controlling the UEs operating on the cell to which the cell specific resource is specific comprises:
transmitting an indication that another uplink resource is restricted from use for the respective MPE measurement.

78. The method of claim 76, wherein to control the UEs operating on the cell to which the cell specific resource is specific comprises:
setting a parameter that governs when an uplink resource is permitted to be used for the respective MPE measurement.

79. The method of claim 76, wherein controlling the UEs operating on the cell to which the cell specific resource is specific comprises:
transmitting an indication regarding use of an uplink resource for the respective MPE measurement, wherein the indication regarding the use of the uplink resource for the respective MPE measurement comprises a parameter in at least one of a Master Information Block (MIB), a System Information Block (SIB), a Medium Access Control (MAC) Control Element (CE), Downlink Control Information (DCI), or a Radio Resource Control (RRC) message, wherein the indication of the cell specific resource limits use of the uplink resource for the respective MPE measurement.

80. The method of claim 79, wherein the cell specific resource comprises a Random Access Channel (RACH) resource, the method further comprising:
measuring a RACH loading, wherein the indication of the cell specific resource configured to be available for use for the respective MPE measurement limits use of the RACH resource for the respective MPE measurement based on the RACH loading.

81. The method of claim 76, wherein controlling the UEs operating on the cell to which the cell specific resource is specific comprises:
transmitting a scheduled period for the respective MPE measurement to the UE.

82. The method of claim 81, wherein the scheduled period for the respective MPE measurement is based on a pending uplink data transmission for the UE.

83. The method of claim 75, wherein the cell specific resource comprises a downlink resource.

84. The method of claim 74, further comprising:
configuring a rise-over-thermal threshold for the respective MPE measurement.

85. The method of claim 74, further comprising:
configuring a maximum receiving power at which a transmission from the UE for the respective MPE measurement is permitted to be received at the base station.

86. The method of claim 74, further comprising:
grouping a plurality of UEs to perform the respective MPE measurement.

87. The method of claim 86, wherein the grouping is based on the plurality of UEs having disparate pathloss.

88. An apparatus for wireless communication at a base station, comprising:
a memory; and
at least one processor coupled to the memory and configured to:
configure a first transmission limitation applicable in a first frequency spectrum that is different from a second frequency spectrum in which another transmission limitation is applicable, each of the first and second transmission limitations being associated with a respective maximum permissible exposure (MPE) measurement that is at least in part representative of radio frequency (RF) exposure caused by a user equipment (UE); and
transmit an indication of the first transmission limitation to the UE for application with a transmission that is associated with the respective MPE measurement.

89. The apparatus of claim 88, wherein the at least one processor is further configured to:
transmit, to the UE, an indication of a cell specific resource configured to be available for use for the respective MPE measurement, wherein the cell specific resource comprises a time resource for at least one of a Random Access Channel (RACH) resource, a beam failure recovery resource, or a scheduling request resource.

90. The apparatus of claim 89, wherein the at least one processor is further configured to control UEs operating on a cell to which the cell specific resource is specific, the control of the UEs operating on the cell comprising to transmit an indication that an uplink resource is permitted to be used for the respective MPE measurement.

91. The apparatus of claim 89, wherein the at least one processor is further configured to control the UEs operating on a cell to which the cell specific resource is specific, the control of the UEs operating on the cell comprising to transmit an indication that an uplink resource is restricted from use for the respective MPE measurement.

92. The apparatus of claim 89, wherein the at least one processor is further configured to control the UEs operating on a cell to which the cell specific resource is specific, the control of the UEs operating on the cell comprising to set a parameter that governs when an uplink resource is permitted to be used for the respective MPE measurement.

93. The apparatus of claim 89, wherein the at least one processor is further configured to control the UEs operating on the cell to which the cell specific resource is specific, the control of the UEs operating on the cell comprising to transmit an indication regarding use of an uplink resource for the respective MPE measurement, wherein the indication regarding the use of the uplink resource for the respective MPE measurement comprises a parameter in at least one of a Master Information Block (MIB), a System Information Block (SIB), a Medium Access Control (MAC) Control Element (CE), Downlink Control Information (DCI), or a Radio Resource Control (RRC) message, wherein the indication of the cell specific resource limits use of the uplink resource for the respective MPE measurement.

94. The apparatus of claim 93, wherein the cell specific resource comprises a Random Access Channel (RACH) resource, and wherein the at least one processor is further configured to:
measure a RACH loading, wherein the indication of the cell specific resource limits use of the RACH resource for the respective MPE measurement based on the RACH loading.

95. The apparatus of claim 89, wherein the at least one processor is further configured to control use of the cell specific resource based on a scheduled period for the respective MPE measurement to the UE.

96. The apparatus of claim 95, wherein the scheduled period for the respective MPE measurement is based on a pending uplink data transmission for the UE.

97. The apparatus of claim 89, wherein the cell specific resource comprises a downlink resource.

98. The apparatus of claim 88, wherein the at least one processor is further configured to:
configure a rise-over-thermal threshold for the respective MPE measurement.

99. The apparatus of claim 88, wherein the at least one processor is further configured to:
configure a maximum receiving power at which a transmission from the UE for the respective MPE measurement is to be received at the base station.

100. The apparatus of claim 88, wherein the at least one processor is further configured to:
group a plurality of UEs to perform the respective MPE measurement.

101. The apparatus of claim 100, wherein the grouping is based on the plurality of UEs having disparate pathloss.

102. An apparatus for wireless communication at a base station, comprising:
means for configuring a first transmission limitation applicable in a first frequency spectrum that is different from a second frequency spectrum in which a second transmission limitation is applicable, each of the first and second transmission limitations being associated with a respective maximum permissible exposure (MPE) measurement that is at least in part representative of radio frequency (RF) exposure caused by a user equipment (UE); and
means for transmitting an indication of the first transmission limitation to the UE for application with a transmission that is associated with the respective MPE measurement.

103. The apparatus of claim 102, further comprising:
means for transmitting an indication of a cell specific resource configured to be available for use for the respective MPE measurement, wherein the cell specific resource comprises a Random Access Channel (RACH) resource;
means for measuring a RACH loading; and
means for controlling UEs operating on a cell to which the cell specific resource is specific at least in part by limiting use of the RACH resource for the respective MPE measurement based on the RACH loading.

104. The apparatus of claim 102, further comprising:
means for configuring a rise-over-thermal threshold for the respective MPE measurement.

105. The apparatus of claim 102, further comprising:
means for configuring a maximum receiving power at which a transmission from the UE for the respective MPE measurement is permitted to be received at the base station.

106. The apparatus of claim 102, further comprising:
means for grouping a plurality of UEs to perform the respective MPE measurement.

107. A non-transitory computer-readable medium storing computer executable code for wireless communication at a base station, comprising code to:
configure a first transmission limitation applicable in a first frequency spectrum that is different from a second frequency spectrum in which a second transmission limitation is applicable, each of the first and second transmission limitations being associated with a respective maximum permissible exposure (MPE) measurement that is at least in part representative of radio frequency (RF) exposure caused by a user equipment (UE); and
transmitting an indication of the first transmission limitation to the UE for application with a transmission that is associated with the respective MPE measurement.

108. The non-transitory computer-readable medium of claim 107, further comprising code to:
transmit an indication of a cell specific resource configured to be available for use for the respective MPE measurement, wherein the cell specific resource comprises a Random Access Channel (RACH) resource; and
measure a RACH loading; and
control UEs operating on a cell to which the cell specific resource is specific at least in part by limiting use of the RACH resource for the respective MPE measurement based on the RACH loading.

109. The non-transitory computer-readable medium of claim 107, further comprising code to:
  configure a rise-over-thermal threshold for the respective MPE measurement.

110. The non-transitory computer-readable medium of claim 107, further comprising code to:
  configure a maximum receiving power at which a transmission from the UE for the respective MPE measurement is permitted to be received at the base station.

111. The non-transitory computer-readable medium of claim 107, further comprising code to:
  group a plurality of UEs to perform the respective MPE measurement.

* * * * *